United States Patent [19]
Muta et al.

[11] Patent Number: 5,657,360
[45] Date of Patent: Aug. 12, 1997

[54] REACTOR CONTAINER

[75] Inventors: Hitoshi Muta, Kawasaki; Kazumi Matsushita, Yokohama, both of Japan

[73] Assignee: Kabushiki Kaisha Toshiba, Kawasaki, Japan

[21] Appl. No.: 529,445

[22] Filed: Sep. 18, 1995

[30] Foreign Application Priority Data

Sep. 19, 1994 [JP] Japan .................. 6-223181

[51] Int. Cl.$^6$ .................................... G21C 15/18
[52] U.S. Cl. ................................ 376/298; 376/277
[58] Field of Search ........................ 376/283, 298, 376/299, 277

[56] References Cited

U.S. PATENT DOCUMENTS

| | | | |
|---|---|---|---|
| 4,057,465 | 11/1977 | Thompson et al. | 376/298 |
| 4,113,561 | 9/1978 | Fidler et al. | 376/299 |
| 4,360,496 | 11/1982 | Marker et al. | 376/298 |
| 4,416,850 | 11/1983 | Kodama et al. | 376/310 |
| 4,643,871 | 2/1987 | Fajeau | 376/298 |
| 4,948,554 | 8/1990 | Gou et al. | 376/283 |
| 4,998,509 | 3/1991 | Gou et al. | 376/298 |
| 5,303,274 | 4/1994 | Sawyer | 376/298 |
| 5,426,681 | 6/1995 | Aburomia | 376/299 |
| 5,488,642 | 1/1996 | Malik et al. | 376/298 |

FOREIGN PATENT DOCUMENTS 62-239091  10/1987  Japan ................ 376/298

*Primary Examiner*—Daniel D. Wasil
*Attorney, Agent, or Firm*—Oblon, Spivak, McClelland, Maier & Neustadt, P.C.

[57] ABSTRACT

A reactor container is composed of a dry well and a wet well and, in the reactor container, there is provided with a dry well cooling system, the dry well cooling system including, in one aspect, an in-dry-well heat exchanger disposed in the dry well of the reactor container, an in-dry-well blower connected to a primary side of the in-dry-well heat exchanger, a circulation pipe connected to a secondary side of the in-dry-well heat exchanger, a normal cooling system connected to the secondary side of the in-dry-well heat exchanger through the circulation pipe and including an equipment cooling pump, an equipment cooling heat exchanger and a seawater pump, and a standby cooling system connected to and branched from the circulation pipe. The dry well cooling system may include an extra-dry-well heat exchanger and blower, and in such case, there is provided an emergency dry well cooling system equipment cooling system connected to a secondary side of the extra-dry-well heat exchanger, the emergency dry well cooling system equipment cooling system including an emergency dry well cooling system equipment cooling pump, an emergency dry well cooling system equipment cooling heat exchanger and an emergency dry well cooling system equipment cooling seawater pump. The pipe lines may respectively be connected to the dry well and the wet well of the reactor container at one end thereof.

5 Claims, 19 Drawing Sheets

REACTOR CONTAINER

BACKGROUND OF THE INVENTION

The present invention relates to a reactor container or reactor containment vessel provided with a dry well cooling system for use in a nuclear power plant.

A reactor container of a boiling water reactor (hereinafter referred to as BWR) is generally divided into a dry well and a wet well. A reactor pressure vessel (hereinafter referred to as RPV) and a reactor primary system are housed in the dry well, and a suppression pool filled with a suppression pool water is also located in the wet well. In accordance with the nuclear policy in various countries such as Japan, design of a nuclear container is obliged to meet with strict requirements in an anticipation of a loss of coolant accident caused by breakage of reactor primary pipings that is one design reference event.

The vapor discharged in the event of breakage of the reactor primary pipings is introduced from the dry well to the suppression pool through a vent pipe for condensation of the vapor so that a pressure increase in the reactor container is suppressed. When the water temperature of the suppression pool is raised due to the condensation of the vapor, a residual heat removal system (hereinafter referred to as an RHR system) is operated to remove the heat from the suppression pool and, hence, the water temperature of the suppression pool can always be kept low.

A dry well cooler is also provided for the purpose of removing the heat dissipated from the reactor container and the reactor primary system during a normal operation and for controlling the temperature in the dry well so as to be prevented from rising excessively and be held within a certain range.

A first example of the dry well cooling system comprises, as shown in FIG. 18, a heat exchanger 3 mounted in a dry well 2 inside a reactor container 1, a blower 4 and a duct, not shown, for circulating an atmosphere in the dry well 2 through the heat exchanger 3, and a normal cooling system 6 for introducing cooling water to the secondary side of the heat exchanger 3 and finally conveying the heat in the dry well 2 to the sea 5 outside the power plant. With such arrangements, the temperature in the dry well 2 is controlled during normal operation. A wet well is not shown but is arranged bellow the dry well in the reactor container.

The cooling water on the secondary side of the heat exchanger 3, disposed in the dry well 2, of the dry well cooling system is conveyed from an equipment cooling pump 7 to the heat exchanger 3 through an equipment cooling heat exchanger 8 and a circulating pipe 9. It is also arranged such that, if necessary, the cooling water can be conveyed to a load 10 for an RHR heat exchanger and a load 11 for equipment cooling as well. The secondary side of the equipment cooling heat exchanger 8 is cooled by conveying seawater 12 to the equipment cooling heat exchanger 8 through the operation of a seawater pump 13. The reason why the seawater is used for the BWR of the described type is that the BWR is usually located near the seaside.

Alternatively, the dry well cooling system comprises a plurality of heat exchangers mounted in a dry well, a plurality of blowers and ducts for circulating a gas in the dry well through the heat exchangers, and a cooling system for circulating cooling water on the secondary side of the heat exchanger and finally conveying the heat in the dry well to the sea outside the power plant, thereby controlling the temperature in the dry well during a normal operation of a nuclear reactor.

FIG. 19 is a block diagram showing a second example of the dry well cooling system for emergency. An atmosphere in a dry well 2 is taken out by a blower 4a disposed outside a reactor container 1, cooled by a heat exchanger 3a, and then returned to the dry well 2 again for removal of heat from the reactor container 1.

The cooling water on the secondary side of the heat exchanger 3a of the dry well cooling system for emergency is conveyed from a reactor equipment cooling pump 7 to the heat exchanger 3a through a reactor equipment cooling heat exchanger 8. It is also designed such that, if necessary, the cooling water of a reactor equipment cooling line 9 can also be conveyed to an RHR heat exchanger load 10 and a load 11 for equipment cooling as well. The secondary side of the reactor equipment cooling heat exchanger 8 is cooled by conveying the seawater 12 to the reactor equipment cooling heat exchanger 8 through the operation of a reactor equipment cooling seawater pump 13.

A nuclear power plant is designed in anticipation of an accident that heat cannot completely be removed from a reactor container because of an occurrence of an abnormal event and simultaneous failure of the RHR system, or an accident wherein a re-supply means of cooling water to the RPV fails to work at the same time as the occurrence of an abnormal event (hereinafter referred to as a severe accident), although the probability of such a severe accident is so very small as to be practically improbable. Even if a severe accident should occur, adequate countermeasures are taken to surely keep safety of the nuclear power plant.

If a severe accident leading to complete an outage of heat removal from a reactor container occurs and the outage continues for a long time, the interior of the nuclear container experiences a condition of high temperature and high pressure. In other words, vapor and incondensable gas at high temperature are built up in a dry well and a wet well to produce a high-temperature and high-pressure condition in the reactor container.

In anticipation of such a severe accident, it has been contemplated to install a nuclear container vent system for discharging vapor and incondensable gas at high temperature fills in the dry well and the wet well to open air from an exhaust tower through a suppression pool.

When a nuclear container vent system is installed and operated to discharge the atmosphere in the reactor container to open air, fission products (hereinafter referred to as FP) contained in the atmosphere in the reactor container are held in water of the suppression pool and almost no FP is contained in the gas discharged to the open air. However, the possibility that a small amount of FP may be discharged to the open air is not zero.

Meanwhile, it is now under consideration to use a cooler mounted in a dry well (hereinafter referred to as a dry well cooler) as means for removing heat from the reactor container. Heat removal using the dry well cooler has no possibility that the atmosphere in the reactor container is directly discharged to the open air. However, since the dry well cooler is intended to remove heat during the normal operation, sufficient heat removal from the reactor container cannot be expected in a condition under high temperature and high pressure in the event of a severe accident.

Further, since the dry well cooler generally shares a cooling system with the RHR system, there is a problem that if the RHR system should be disabled, the dry well cooler also does not work. Moreover, there is also provided a problem that reliability of the dry well cooler is low.

SUMMARY OF THE INVENTION

A primary object of the present invention is to substantially eliminate defects or drawbacks encountered in the prior art described above and to provide a reactor container provided with a dry well cooling system of a reactor container capable of removing heat from the reactor container without discharging a fission product into the open air even in the event of a severe accident, and hence, achieving high reliability.

Another object of the present invention is to provide a reactor container provided with a dry well cooling system of capable of removing heat from a dry well independently in the event of an accident so that heat can be removed from the reactor container even when the function of a residual heat removing system is disabled, thereby maintaining the soundness of the reactor container.

These and other objects can be achieved according to the present invention by providing, in one aspect, a reactor container composed of a dry well and a wet well and provided with a dry well cooling system, the dry well cooling system comprising:

an in-dry-well heat exchanger disposed in the dry well of the reactor container;

an in-dry-well blower connected to a primary side of the in-dry-well heat exchanger;

a circulation pipe connected to a secondary side of the in-dry-well heat exchanger;

a normal cooling system connected to the secondary side of the in-dry-well heat exchanger through the circulation pipe and including an equipment cooling pump, an equipment cooling heat exchanger and a seawater pump which are operatively connected to each other; and a standby cooling system connected to and branched from the circulation pipe.

The standby cooling system comprises a standby cooling pump and a standby cooling heat exchanger connected to each other and comprises a standby seawater pump connected to the standby cooling heat exchanger. A normal power supply means and an emergency power supply means are connected to the in-dry-well blower, the seawater pump, the standby cooling pump and the standby seawater pump. The standby cooling system comprises a seawater circulation line for directly circulating the seawater therethrough and a seawater pump for pumping up the seawater. The standby cooling system may comprise a standby cooling pump and an air cooler connected to each other.

In another aspect, there is provided a reactor container composed of a dry well and a wet well and provided with a dry well cooling system, the dry well cooling system comprising:

an in-dry-well heat exchanger disposed in a dry well of the reactor container;

an in-dry-well blower connected to a primary side of the in-dry-well heat exchanger; and a dedicated dry well cooling system connected to a secondary side of the in-dry-well heat exchanger, the dedicated dry well cooling system comprising a dedicated cooling pump, a dedicated cooling heat exchanger and a dedicated cooling seawater pump which are operatively connected to each other.

In a further aspect, there is provided a reactor container composed of a dry well and a wet well and provided with a dry well cooling system, the dry well cooing system comprising:

an in-dry-well heat exchanger disposed in a dry well of the reactor container;

an in-dry-well blower connected to a primary side of the in-dry-well heat exchanger;

a circulation pipe connected to a secondary side of the in-dry-well heat exchanger; and a cooling system connected to the secondary side of the in-dry-well heat exchanger and including an equipment cooling pump, an equipment cooling heat exchanger and a seawater pump, the in-dry-well heat exchanger and the in-dry-well blower being surrounded by environmental condition resistance maintaining equipment.

In a further aspect, there is provided a reactor container composed of a dry well and a wet well and provided with a dry well cooling system, the dry well cooling system comprising:

an extra-dry-well blower disposed outside the reactor container and connected to the dry well of the reactor container;

an extra-dry-well heat exchanger connected to the extra-dry-well blower and having a primary side connected to the dry well; and an emergency dry well cooling system equipment cooling system connected to a secondary side of the extra-dry-well heat exchanger, the emergency dry well cooling system equipment cooling system comprising an emergency dry well cooling system equipment cooling pump, an emergency dry well cooling system equipment cooling heat exchanger and an emergency dry well cooling system equipment cooling seawater pump which are operatively connected to each other.

A normal power supply means and an emergency power supply means are connected to the extra-dry-well blower, the emergency dry well cooling system equipment cooling pump, and the emergency dry well cooling system equipment cooling seawater pump.

The dry well cooling system further comprises a pressure sensor and a temperature sensor which are disposed in the reactor container, an emergency dry well cooling system automatic start-up circuit adapted to receive respective output signals from the pressure sensor and the temperature sensor, the emergency dry well cooling system automatic start-up circuit being also adapted to receive a function outage signal output from a residual heat removing system, and signal lines for applying output signals from the emergency dry well cooling system automatic start-up circuit to the extra-dry-well blower, the emergency dry well cooling system equipment cooling pump and the emergency dry well cooling system equipment cooling seawater pump. The extra-dry-well blower is connected to a downstream side of the extra-dry-well heat exchanger.

The dry well cooling system further comprises a header disposed in the reactor container and connected to a cooling water delivery port on the primary side of the extra-dry-well heat exchanger.

A branch pipe is connected to a line between the reactor container and the extra-dry-well blower, a safety valve is connected to the branch pipe, and a pipe on a discharge side of the safety valve is connected to a vent line.

In a further aspect, there is provided a reactor container composed of a dry well and a wet well and provided with a dry well cooling system, the dry well cooling system comprising:

an extra-dry-well blower disposed outside the reactor container and connected to the dry well of the reactor container;

an extra-dry-well heat exchanger connected to the extra-dry-well blower and having a primary side connected to the dry well; and an emergency dry well cooling system equipment air cooling system connected to a secondary side of the extra-dry-well heat exchanger, the emergency dry well cooling system equipment air cooling system comprising an emergency dry well cooling system equipment air cooling pump and an air cooler.

In a further aspect, there is provided a reactor container composed of a dry well and a wet well and provided with a dry well cooling system, the dry well cooling system comprising:

an extra-dry-well blower disposed outside the reactor container and connected to the dry well of the reactor container;

an extra-dry-well heat exchanger connected to the extra-dry-well blower and having a primary side connected to the dry well;

pipe lines having one ends connected to the dry well and the wet well of the reactor container and other ends connected to the extra-dry-well heat exchanger;

a circulation pipe connected to a secondary side of the extra-dry-well heat exchanger;

a primary cooling system provided with a pump and a heat exchanger connected through the circulation pipe; and a secondary cooling system provided with a seawater pump.

A blower duct means is disposed in the dry well of the reactor container and connected to the primary side of the extra-dry-well heat exchanger through the extra-dry-well blower.

In a further aspect, there is provided a reactor container composed of a dry well and a wet well and provided with a dry well cooling system, the dry well cooling system comprising:

an extra-dry-well blower disposed outside the reactor container and connected to the dry well of the reactor container;

an extra-dry-well heat exchanger connected to the extra-dry-well blower and having a primary side connected to the dry well;

pipe lines having one end of each thereof respectively connected to the dry well and the wet well of the reactor container and the other end thereof respectively connected to the extra-dry-well heat exchanger;

a circulation pipe connected to a secondary side of the extra-dry-well heat exchanger; and a cooling system provided with a seawater circulation pipe connected to the extra-dry-well heat exchanger and a seawater pump connected through the seawater circulation pipe.

In a further aspect, there is provided a reactor container composed of a dry well and a wet well and provided with a dry well cooling system, the dry well cooling system comprising:

an extra-dry-well blower disposed outside the reactor container and connected to the dry well of the reactor container;

an extra-dry-well heat exchanger connected to the extra-dry-well blower and having a primary side connected to the dry well; and pipe lines having one end thereof respectively connected to the dry well and the wet well of the reactor container and the other end thereof respectively connected to the extra-dry-well heat exchanger, the extra-dry-well heat exchanger being disposed in a cooling pool opened to atmosphere and filled up with water, the cooling pool acting as a heat sink.

According to the various aspects and features of the present invention, the following functions and effects will be achieved.

First, concerning the first to sixth embodiments, which will be described concretely hereinafter with reference to FIGS. 1 to 6, the cooling system for a dry well cooler includes, in addition to the cooling system used during the normal operation of the reactor, the standby cooling system having a capacity comparable to the normal cooling system. Therefore, even if the normal cooling system should fail to work and the function of removing heat from the reactor container should be totally disabled, the heat removal from the reactor container can be performed through the dry well cooler by switching the cooling system from the normal one to the standby one.

The dedicated cooling system or the standby cooling system includes an air cooler and a pump for conveying the cooling water, unlike the normal cooling system using the seawater. Therefore, even during the inspection period of the seawater cooling system, the dry well cooler can be operated. Also, since the dedicated or standby cooling system employs a cooling method different from the normal cooling system, the possibility that at the same time as when the normal cooling system fails, the dedicated or standby cooling system also fails due to the common cause, is avoided.

The present invention, the dry well cooler can also be operated by the electric power supplied from an emergency power supply means. Therefore, even if the normal power supply depending on the external power source should fail to work and the function of the dry well cooler should be disabled, it is possible to operate the dry well cooler by starting up the emergency power supply means, i.e., an emergency diesel generator (EDG).

The cooling system for the dry well cooler includes the dedicated cooling system. Therefore, even if the function of the RHR system for removing heat from the reactor container should be disabled due to a failure of the associated cooling system, the function of the dry well cooler can be maintained because the cooling system for the dry well cooler is independent of the RHR cooling system.

In addition, the blower and the heat exchanger of the dry well cooler both mounted in the dry well are designed to have such a environment-resistant capability that is sufficient to protect the blower and the heat exchanger against the high-temperature, high-pressure, high-humidity and aqueous atmosphere condition produced in the event of a severe accident. Therefore, sufficient heat removal by the dry well cooler can be ensured under various environmental conditions that result in the event of a severe accident.

As described above, according to these embodiments the reliability of the dry well cooler in the event of a severe accident can be improved and the heat removal from the reactor container can more surely be performed even if a severe accident should occur.

Next, concerning the seventh to thirteenth embodiments of the present invention, which will be described concretely hereinafter with reference to FIGS. 7 to 13, the emergency dry well cooling system can remove heat from the reactor independently. Therefore, even if the function of the RHR system for removing the heat from the reactor container should be also disabled at the same time as the occurrence of an accident, it is possible to prevent breakage of the reactor container and avoid discharge of the FP in a large amount by ensuring the sufficient heat removal from the reactor container.

The secondary cooling system of the emergency dry well cooling system is a dedicated cooling system. Therefore, even if the function of the secondary cooling system for the RHR system should be disabled, the emergency dry well cooling system can be operated to remove the heat from the reactor container without suffering from any effects.

The secondary cooling system of the emergency dry well cooling system includes an air cooler and a pump for conveying cooling water. Although the usual seawater cooling system cannot be operated during the term for inspection of a seawater intake port and so on, the present emergency dry well cooling system can be operated during such inspection term since the air cooler is used for cooling the heat exchanger. Also, since the present emergency dry well cooling system employs a different cooling method from the normal cooling system, it is possible to prevent both the cooling systems from being failed with the common cause.

The emergency dry well cooling system can also be operated by the electric power supplied from the emergency power supply means. Therefore, even if the normal power supply means depending on the external power source should fails to work, the heat removal from the reactor container can be performed by the electric power supplied from the emergency diesel generator.

In addition, the automatic start-up logic for the emergency dry well cooling system is provided. Therefore, if the temperature or pressure in the reactor container is excessively raised due to a functional outage of the residual heat removing system in the event of an accident, the emergency dry well cooling system is automatically started up to perform heat removal from the reactor container. As a result, a remarkable improvement in safety operation can be expected.

Furthermore, the emergency dry well cooling system is designed to have the blower disposed downstream of the heat exchanger. With this embodiment, the air cooled by the heat exchanger is returned into the reactor container by the blower. Therefore, the thermal load imposed on the blower is reduced and the total reliability of the emergency dry well cooling system can be increased.

The emergency dry well cooling system is designed to have a header provided at its delivery, i.e., discharge, port of cooling water into the dry well. Therefore, the efficiency in cooling atmosphere in the dry well can be increased.

The emergency dry well cooling system is designed to have a vent line connected to the intermediate portion of the cooling system line. Therefore, even if the pressure in the dry well should abruptly rise, the pressure in the reactor container can be suppressed while preventing breakage of the emergency dry well cooling system.

Furthermore, concerning the fourteenth to seventeenth embodiments of the present invention, which will be described concretely hereinafter with reference to FIGS. 14 to 17, in a case where an accident occurs in a normal operation condition, the reactor scrams, and thereafter, vapor in the RPV is flown out in the vent tube or into the suppression pool through a safety relief valve. At this time, the vapor is condensed by the water in the suppression pool and a fission product contained in the vapor is captured in the suppression pool water through a scrubbing effect and transferred to the wet well gas phase. According to these embodiments of the present invention, the atmosphere in the wet well is circulated to the suppression pool liquid phase through the cooling system, the dry well and the vent tube, thus the fission product in the suppression pool gas phase can be scrubbed more effectively.

When an accident occurs during the normal operation, the reactor is shut-down and the core is cooled. Thereafter, when the reactor container is cooled, by the RHR system through one of the suppression pool cooling mode and the dry well spray mode. In the prior art technology, the suppression pool cooling means is not provided, but according to the present invention, the safeness of the reactor can be realized with high performance.

Further, it will be easily understood that the arrangement of the first to thirteenth embodiments may be selectively applicable to the fourteenth to seventeenth embodiments of the present invention by persons skilled in the art without specifically describing the same herein with reference to the accompanying drawings.

The nature and further features of the present invention will be made more clear from the following descriptions made with reference to the accompanying drawings.

DESCRIPTION OF THE PREFERRED EMBODIMENTS

A first embodiment of a reactor container provided with a dry well cooling system according to the present invention will be described hereunder with reference to FIG. 1.

Figure 1:
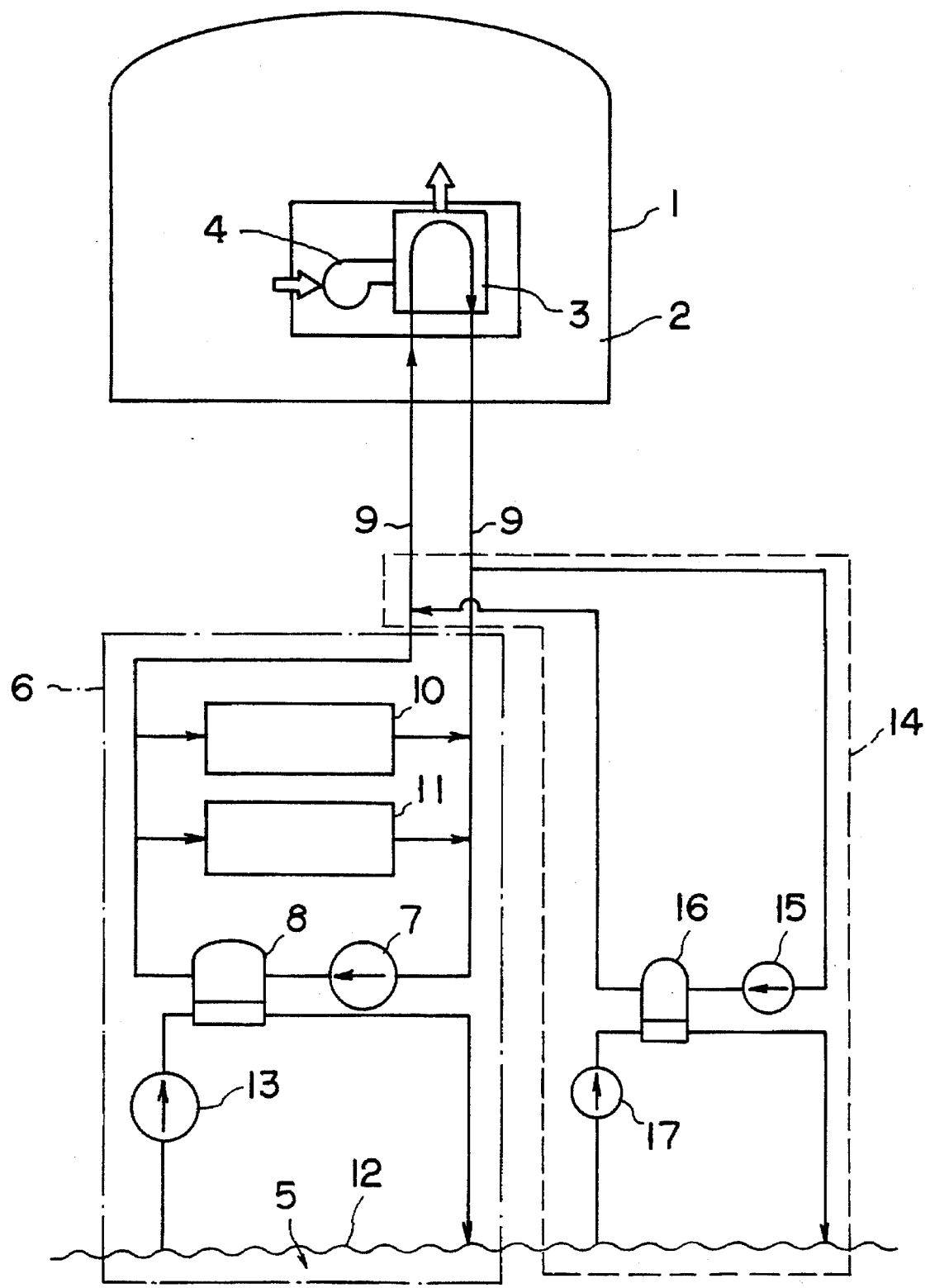
FIG. 1 is a block diagram showing a first embodiment of a reactor container provided with a dry well cooling system according to the present invention.

In FIG. 1, denoted by reference numeral 1 is a reactor container which is divided to define a dry well 2 and a wet well therein. An in-dry-well heat exchanger 3 is disposed in the dry well 2, and an in-dry-well blower 4 is provided on and connected to the primary side of the in-dry-well heat exchanger 3. The wet well is not shown in FIGS. 1-13 in connection with first to thirteenth embodiments of the present invention, but it will be easily understood by persons skilled in the art that the wet well is disposed below the dry well 2 in the reactor container 1 such as located in a reactor container of FIGS. 14 to 17.

A circulation pipe 9 is connected to the secondary side, i.e., a heat transfer pipe, of the in-dry-well heat exchanger 3, and a normal cooling system 6 is connected to the circulation pipe 9. The normal cooling system 6 includes an equipment cooling pump 7, an equipment cooling heat exchanger 8, and a seawater pump 13.

A standby cooling system 14 is branched from the circulating pipe 9 at an intermediate portion between the reactor container 1 and the normal cooling system 6. The standby cooling system 14 is intended to flow cooling water into the heat transfer pipe of the in-dry-well heat exchanger 3 for cooling the same. The cooling water is introduced by a standby cooling pump 15 to a standby cooling heat exchanger 16 where the water is cooled. Then, the cooling water is conveyed to the heat transfer pipe of the in-dry-well heat exchanger 3. In other words, the standby cooling system 14 comprises the standby cooling pump 15, the standby cooling heat exchanger 16, and a standby seawater pump 17 for supplying seawater 12 from the sea 5 as cooling water to the secondary side of the standby cooling heat exchanger 16.

Figure 2:
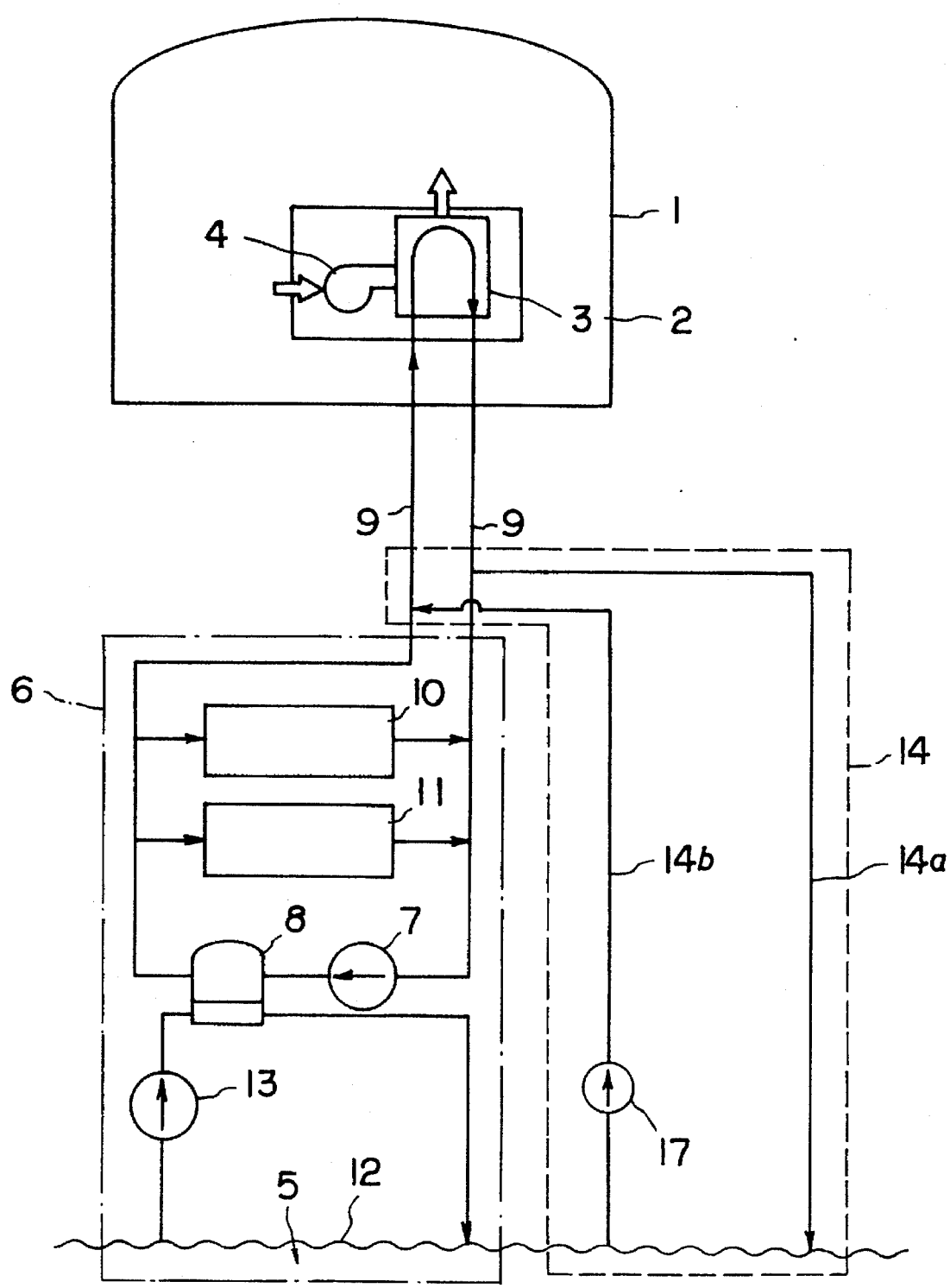
FIG. 2 is a block diagram showing a second embodiment of a reactor container provided with a dry well cooling system according to the present invention.

A second embodiment of the present invention shown in FIG. 2 is basically similar to the above first embodiment except that the standby cooling pump 15 and the standby cooling heat exchanger 16 are omitted. The standby cooling system 14 is constituted as a direct seawater cooling system which acts to directly supply the seawater 12 to the in-dry-well heat exchanger 3 by using only the seawater pump 17. More specifically, a standby cooling discharge pipe 14a and a supply pipe 14b are connected, as seawater circulation line in communication with the sea 5, to respective lines of the circulation pipe 9, and the standby seawater pump 17 is connected to the supply pipe 14b.

With the first and second embodiments explained above, even when the normal cooling system 6 is brought into an outage due to failure or inspection, the in-dry-well heat exchanger 3 can be cooled by operating the standby cooling system 14 and the interior of the dry well 2 can be cooled by the in-dry-well blower 4. As a result, the reliability of the dry well cooling system can be improved.

With the following embodiments, the present invention will be described with reference to structure different from that of the first or second embodiment by adding new reference numerals and like reference numerals to portions or members corresponding to those shown in FIGS. 1 and 2 and the explanations thereof are omitted herein.

Figure 3:
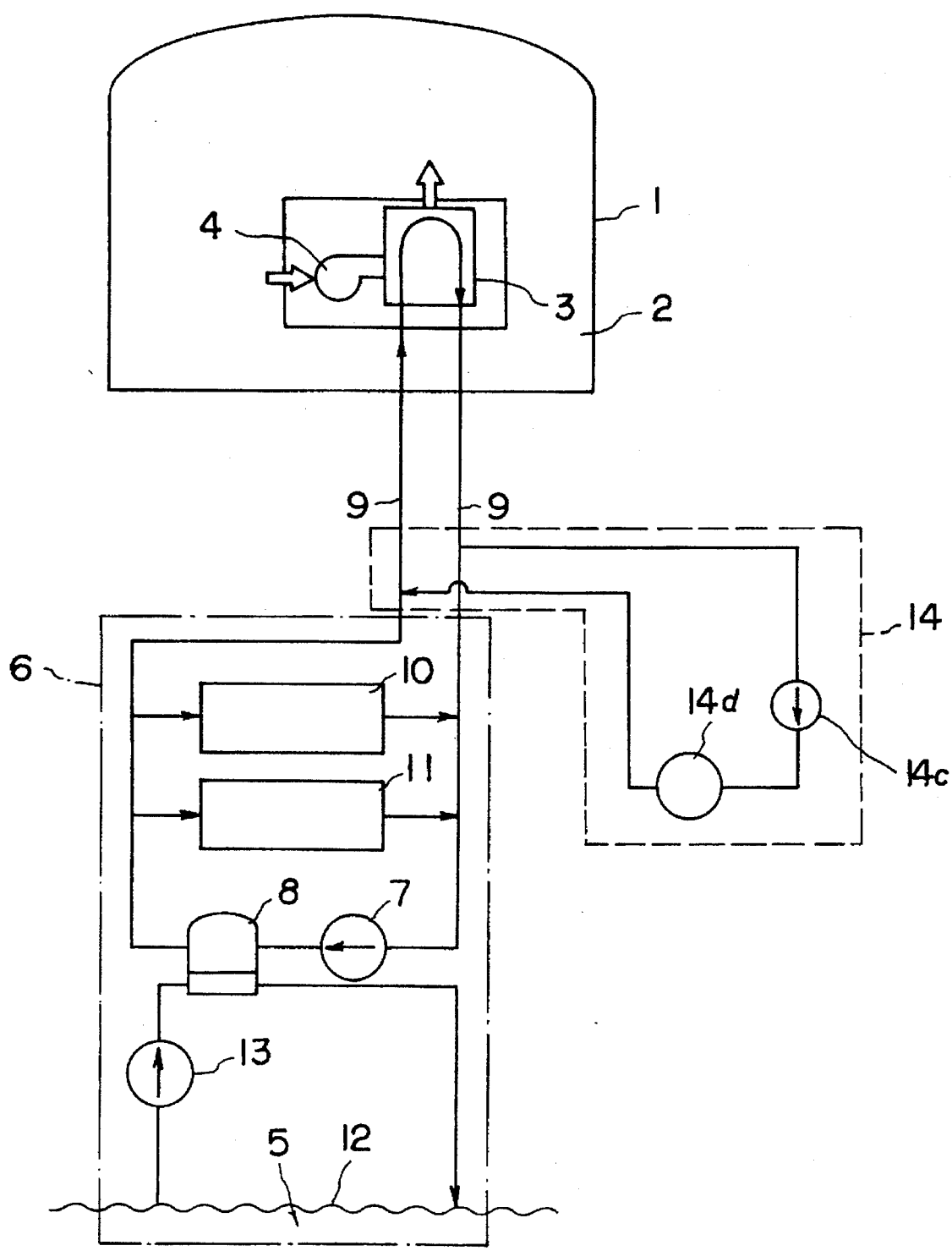
FIG. 3 is a block diagram showing a third embodiment of a reactor container provided with a dry well cooling system according to the present invention.

A third embodiment of the present invention will be described hereunder with reference to FIG. 3.

In the third embodiment, the standby cooling system 14 is likewise connected to the circulation pipe 9, but it comprises a standby cooling pump 14c and an air cooler 14d connected to each other. With this third embodiment, therefore, the standby cooling system can be operated with no need of operating the seawater pump. Accordingly, even during the periodic inspection of the seawater cooling system, the dry well cooling system can be operated by using the standby cooling system.

Figure 4:
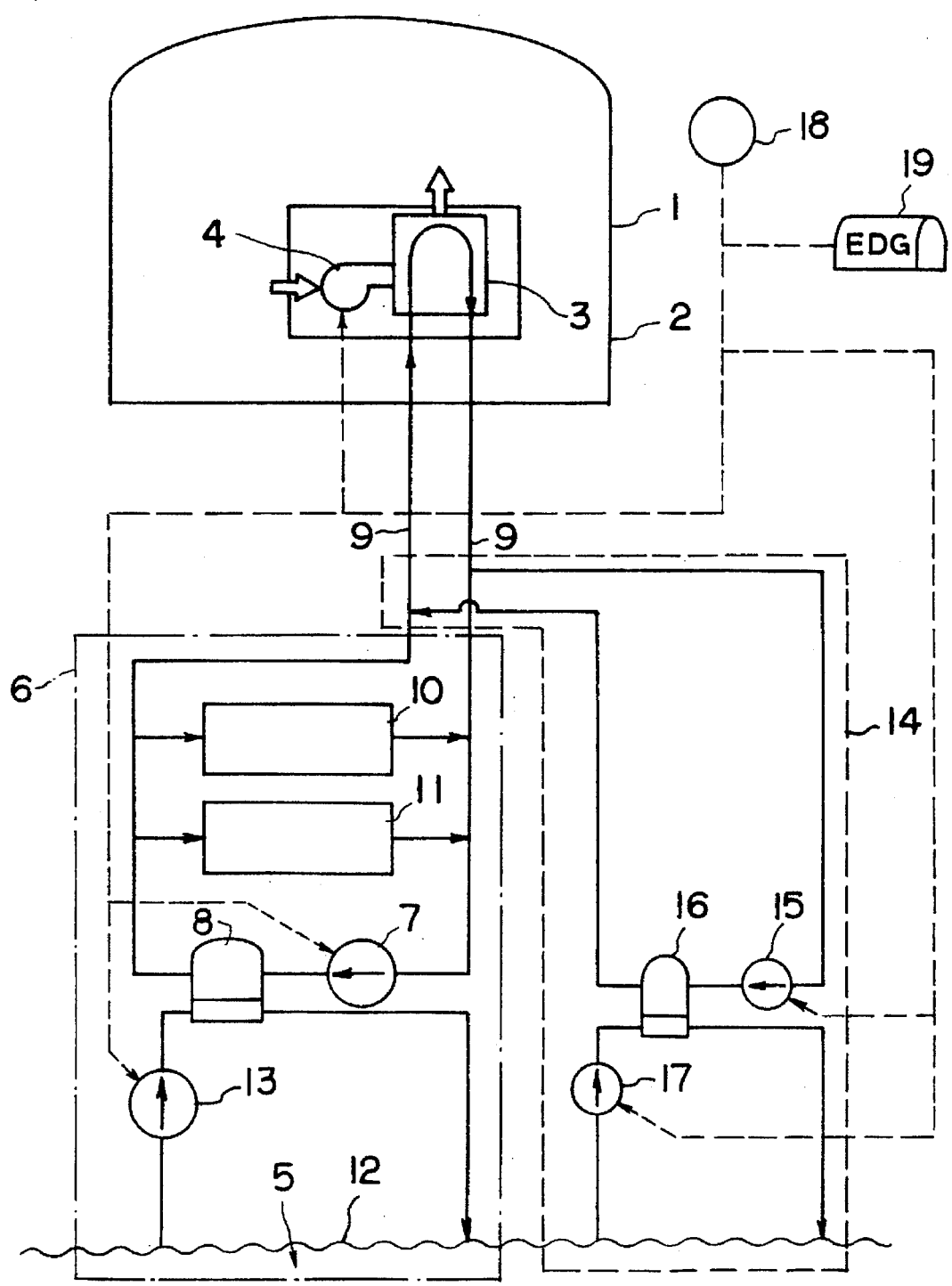
FIG. 4 is a block diagram showing a fourth embodiment of a reactor container provided with a dry well cooling system according to the present invention.

A fourth embodiment of the present invention will be described hereunder with reference to FIG. 4.

The fourth embodiment is different from the above first embodiment in that electric power necessary for operating various equipment can be supplied from not only a normal power supply 18 under ordinary condition, but also an emergency power supply 19 at need. With the fourth embodiment, therefore, even when the normal power supply 18 is disabled due to the outage of the external power source, the dry well cooling system can be operated by the electric power supplied from the emergency power supply 19 to remove the heat from the reactor container.

Figure 5:
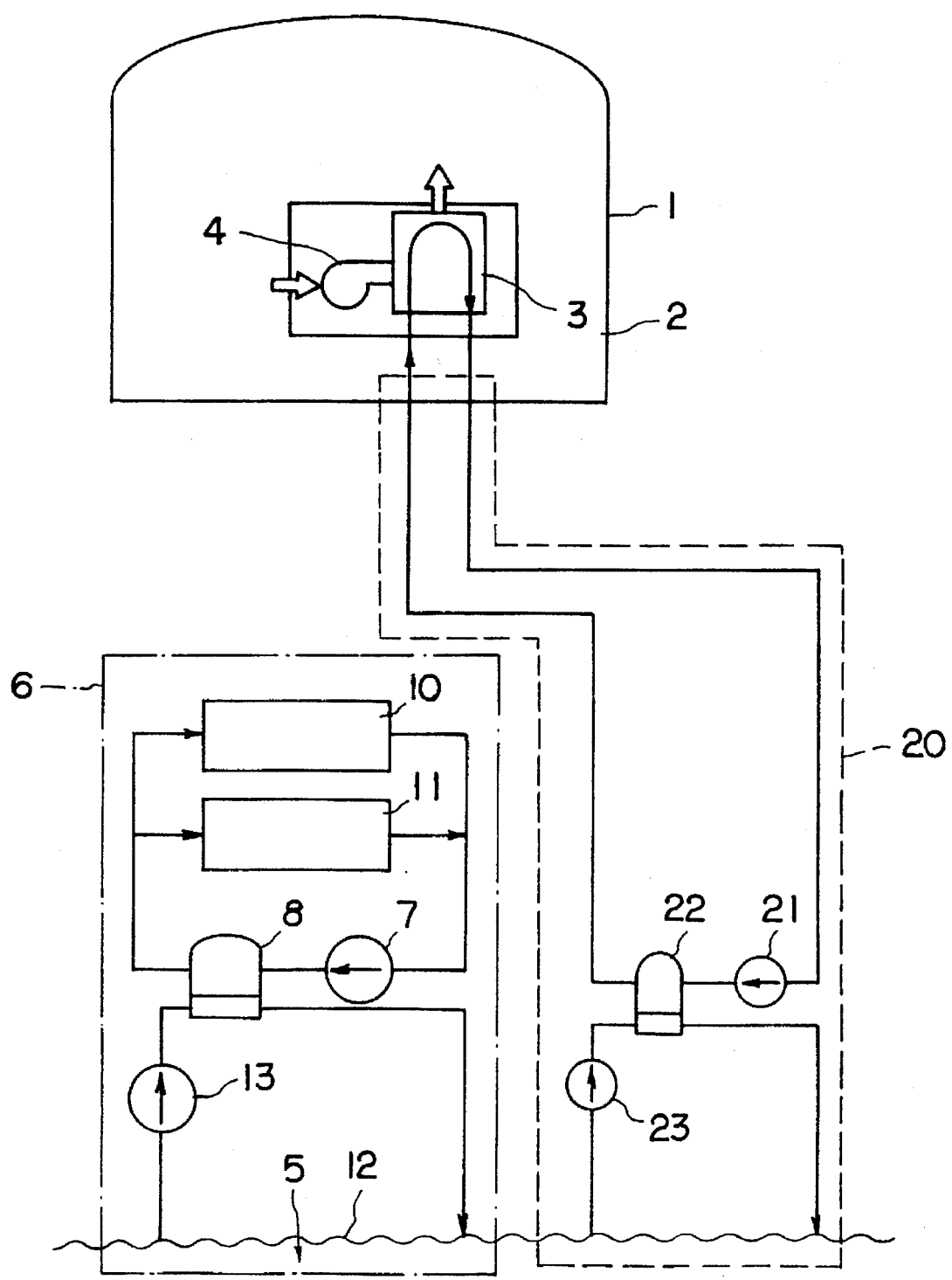
FIG. 5 is a block diagram showing a fifth embodiment of a reactor container provided with a dry well cooling system according to the present invention.

A fifth embodiment of the present invention will be described hereunder with reference to FIG. 5.

In the fifth embodiment, the normal cooling system 6 in the above first embodiment is disconnected from the in-dry-well heat exchanger 3 and constituted as a separate system, whereas a dedicated cooling system 20 is provided on and connected to the secondary side of the in-dry-well heat exchanger 3. The dedicated cooling system 20 comprises a dedicated cooling pump 21, a dedicated cooling heat exchanger 22, and a dedicated cooling seawater pump 23.

With this embodiment, even when the RHR system is failed and its cooling function is disabled, the cooling system in the dry well can be operated so that the function of the dry well cooler for removing the heat from the reactor container is ensured.

A sixth embodiment of the present invention will now be described with reference to FIG. 6.

In the sixth embodiment, the in-dry-well blower 4 and heat exchanger 3 disposed in the dry well 2 inside the reactor container 1 are associated with an environmental condition resistance maintaining equipment 24 to maintain their performance so that the blower 4 and the heat exchanger 3 can endure against serious environmental conditions, i.e., high-temperature, high-pressure, high-humidity and aqueous atmosphere, in an anticipation of a severe accident, thereby enabling the dry well cooling system to operate.

With this sixth embodiment, even if the atmosphere in the dry well 2 should exceed conventional design conditions, i.e., a temperature of 200° C., pressure of 10 Kg/cm$^2$ and humidity of 100%, in the event of a severe accident, the performance of the dry well cooling system can be maintained to ensure sufficient heat removal from the reactor container.

Figure 6:
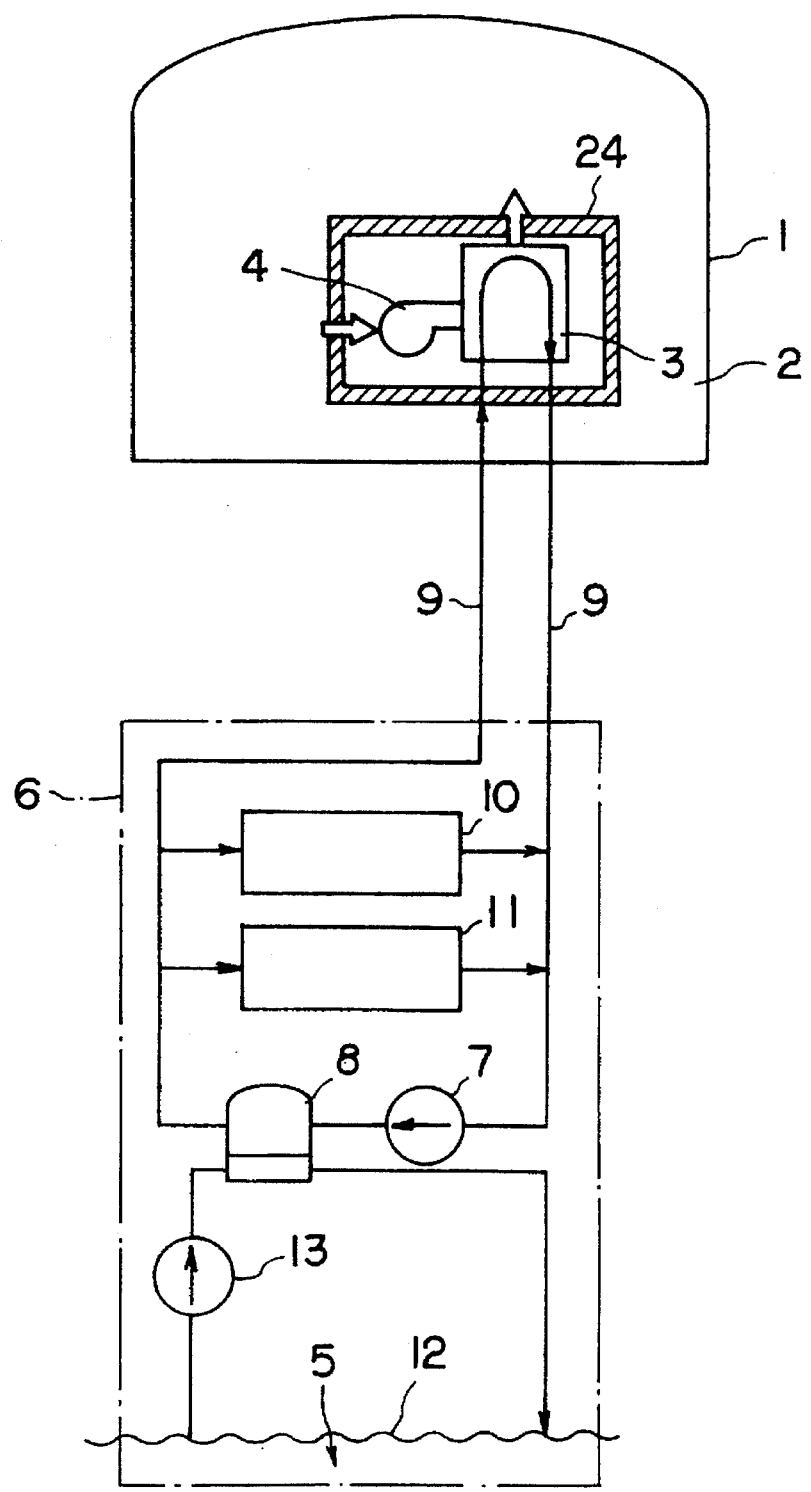
FIG. 6 is a block diagram showing a sixth embodiment of a reactor container provided with a dry well cooling system according to the present invention.

Also, even when an atmosphere of sprayed water droplets is produced in the dry well 2 by a reactor container spray, not shown in FIG. 6, the dry well cooling system can be operated to effect sufficient heat removal. Therefore, even if the heat removal function of the RHR system should be disabled in the event of a severe accident, the dry well cooling system can remove the heat from the reactor container with the sufficient reliability.

A seventh embodiment of the present invention will be described hereunder with reference to FIG. 7.

In the seventh embodiment, an extra-dry-well blower 4a is mounted outside the reactor container 1 through a pipe 4b communicating with the dry well 2 of the reactor container 1, and the delivery side of the extra-dry-well blower 4a is connected to an inlet pipe 3b on the primary side of an extra-dry-well heat exchanger 3a. A return pipe 3c on the primary side of the extra-dry-well heat exchanger 3a is connected to the reactor container 1 to be communicated with the dry well 2. An emergency dry well cooling system equipment cooling system 25 is connected to a circulating pipe 3d on the secondary side of the extra-dry-well heat exchanger 3a.

The emergency dry well cooling system equipment cooling system 25 comprises an emergency dry well cooling system equipment cooling pump 26, an emergency dry well cooling system equipment cooling heat exchanger 27, and an emergency dry well cooling system equipment cooling seawater pump 28, which are operatively connected to each other.

Figure 7:
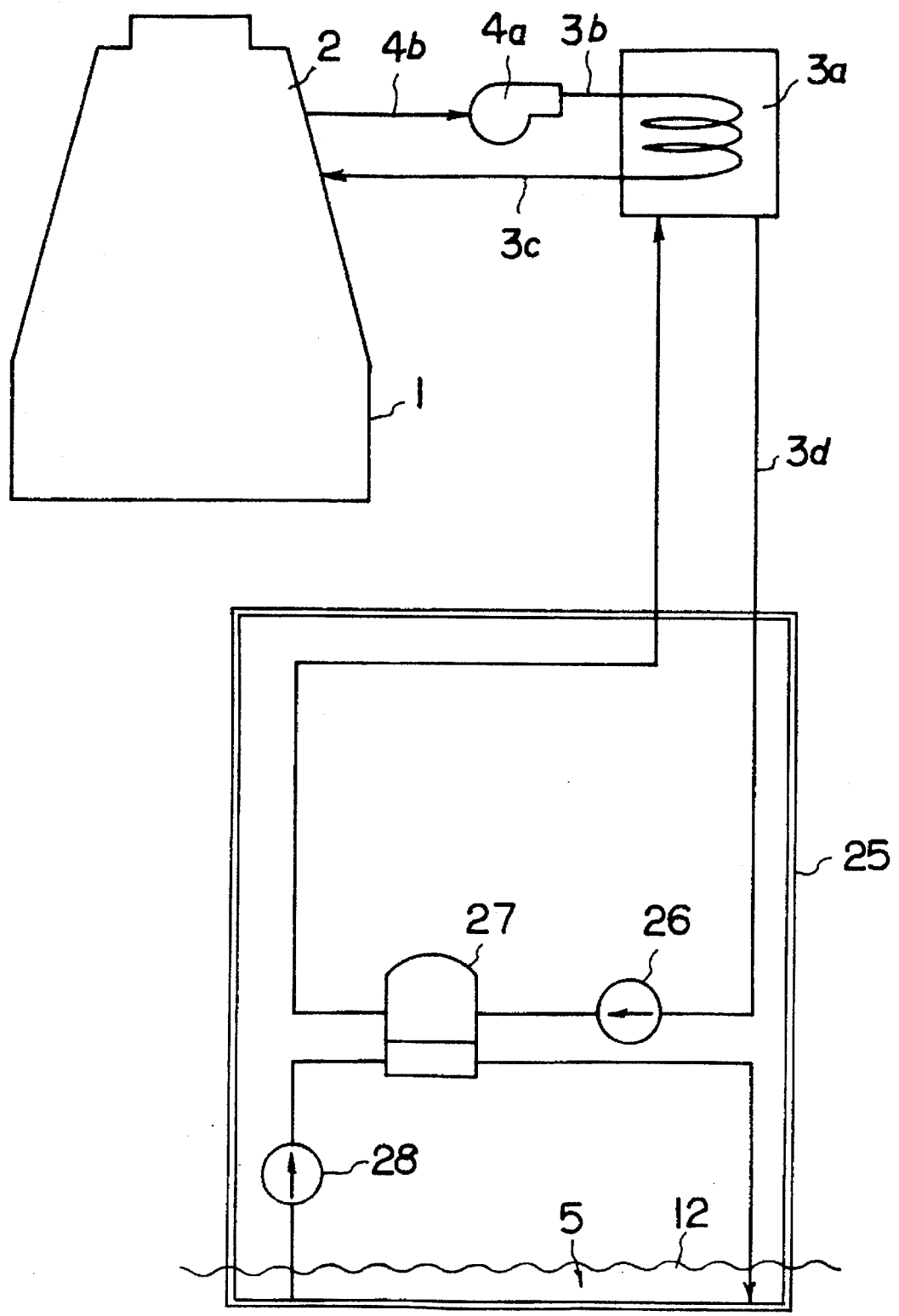
FIG. 7 is a block diagram showing a seventh embodiment of a reactor container provided with a dry well cooling system according to the present invention.

Thus, the seventh embodiment of the present invention shown in FIG. 7 includes a system dedicated for secondary cooling of the extra-dry-well heat exchanger 3a, i.e., the emergency dry well cooling system equipment cooling system 25. In this embodiment, the emergency dry well cooling system equipment cooling pump 26 conveys cooling water from the extra-dry-well heat exchanger 3a to the emergency dry well cooling system equipment cooling heat exchanger 27, and the emergency dry well cooling system equipment cooling seawater pump 28 conveys the seawater 12 to the emergency dry well cooling system equipment cooling heat exchanger 27, thereby cooling the heat in the dry well 2.

An eighth embodiment of the present invention will be described hereunder with reference to FIG. 8.

This eighth embodiment is of the same arrangements as the above seventh embodiment except that an emergency dry well cooling system equipment air cooling system 26 is provided in place of the emergency dry well cooling system equipment cooling system 25.

Figure 8:
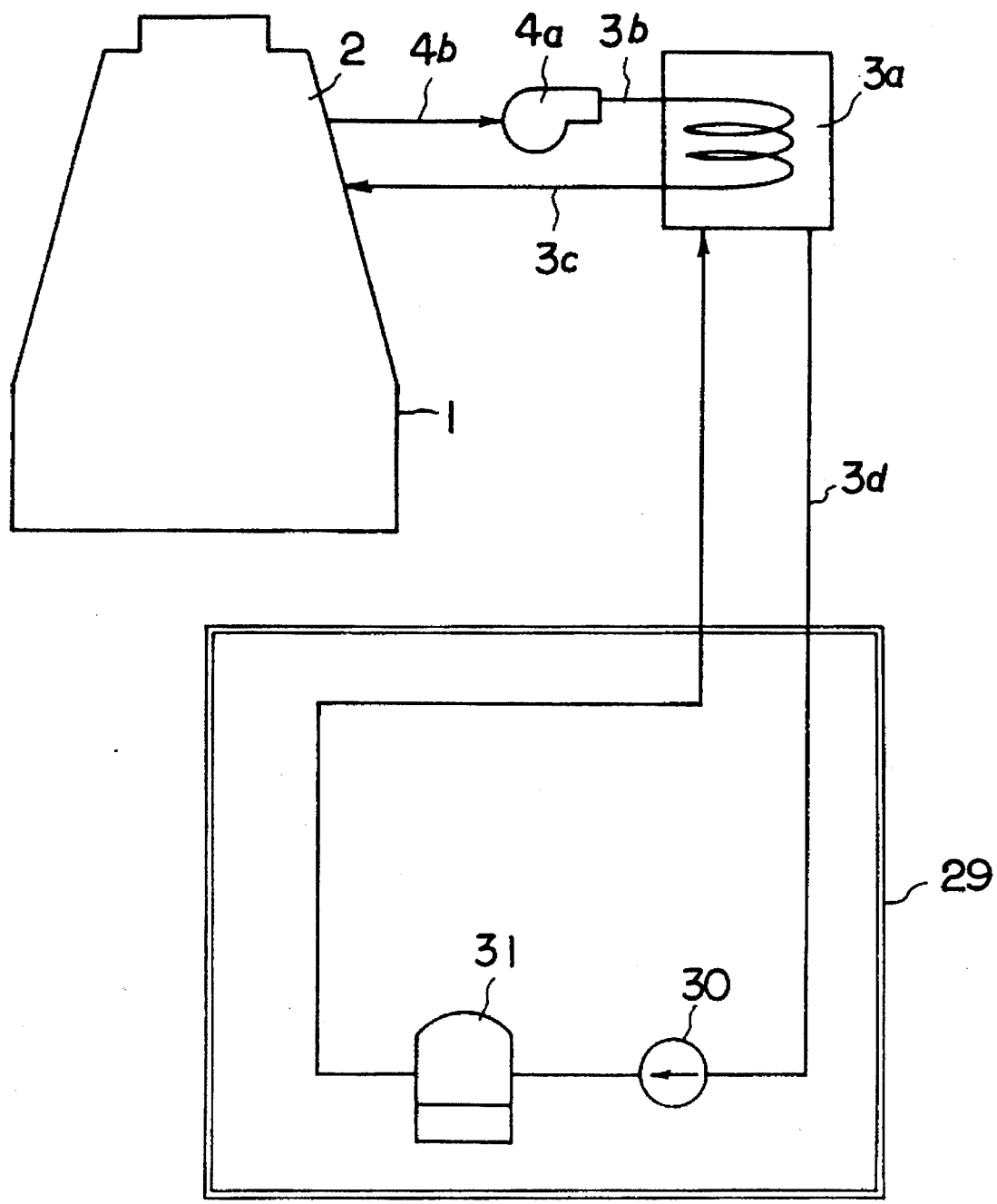
FIG. 8 is a block diagram showing an eighth embodiment of a reactor container provided with a dry well cooling system according to the present invention.

The eighth embodiment of the present invention shown in FIG. 8 includes an emergency dry well cooling system equipment air cooling pump 26 and an air cooler 31 for cooling the secondary side of the extra-dry-well heat exchanger 3a. With this embodiment, the emergency dry well cooling system equipment cooling system can be operated with no need of operating the seawater pump. As a result, even during inspection of the seawater cooling system, the emergency dry well cooling system can be operated.

A ninth embodiment of the present invention will be described hereunder with reference to FIG. 9.

The ninth embodiment is different from the seventh embodiment in that not only the normal power supply 18 but also the emergency power supply 19 are electrically connected to the extra-dry-well blower 4a, the emergency dry well cooling system equipment cooling pump 26, and the emergency dry well cooling system equipment cooling seawater pump 28.

Figure 9:
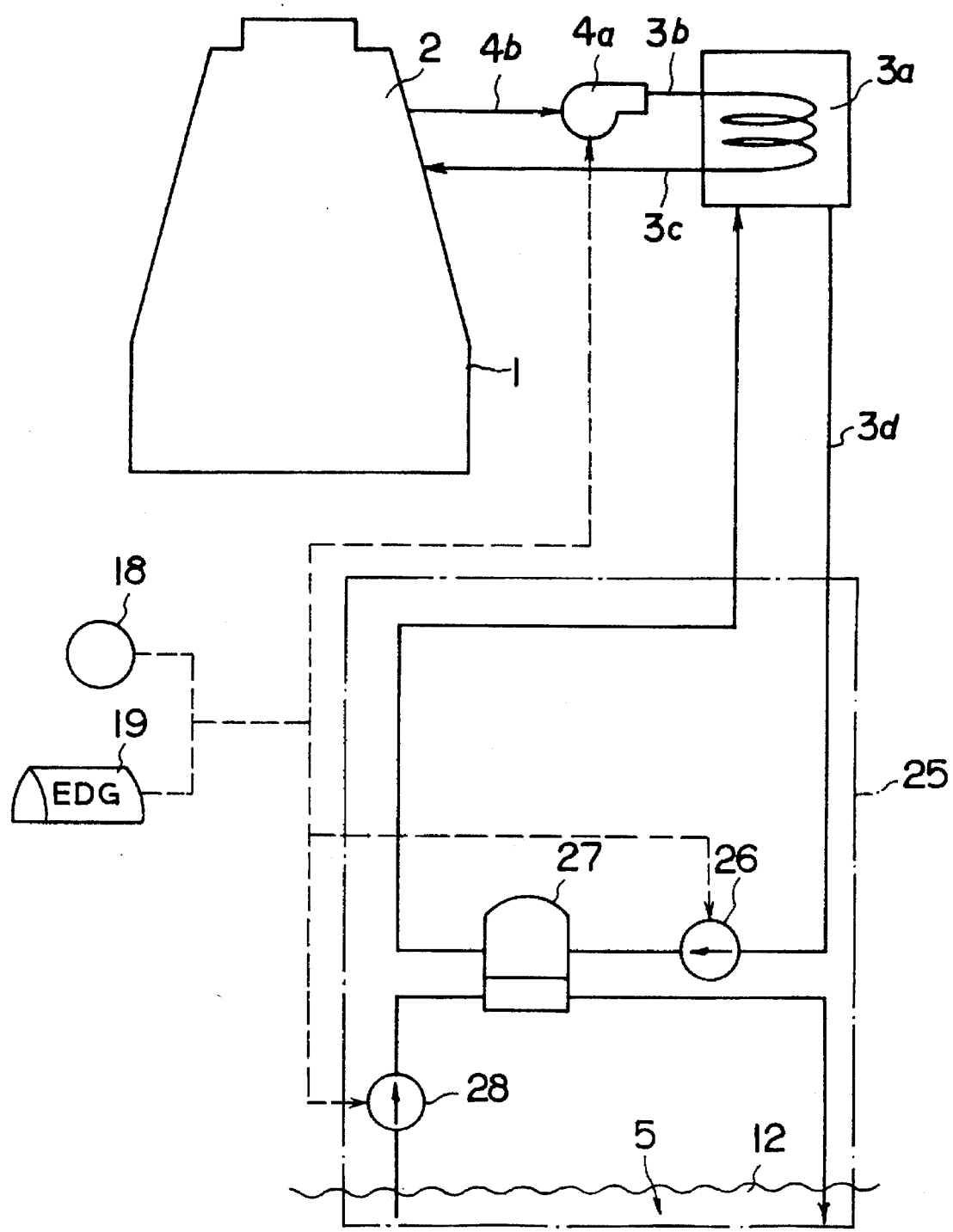
FIG. 9 is a block diagram showing a ninth embodiment of a reactor container provided with a dry well cooling system according to the present invention.

In the ninth embodiment of the present invention shown in FIG. 9, electric power can be supplied from an emergency diesel generator (EDG), i.e., the emergency power supply 19, to the emergency dry well cooling system and the emergency dry well cooling system equipment cooling system. With this embodiment, therefore, even when the normal power supply is disabled due to outage of the external power source, the emergency dry well cooling system can be operated by electric power supplied from the emergency power supply 19 to remove the heat from the reactor container.

Figure 10:
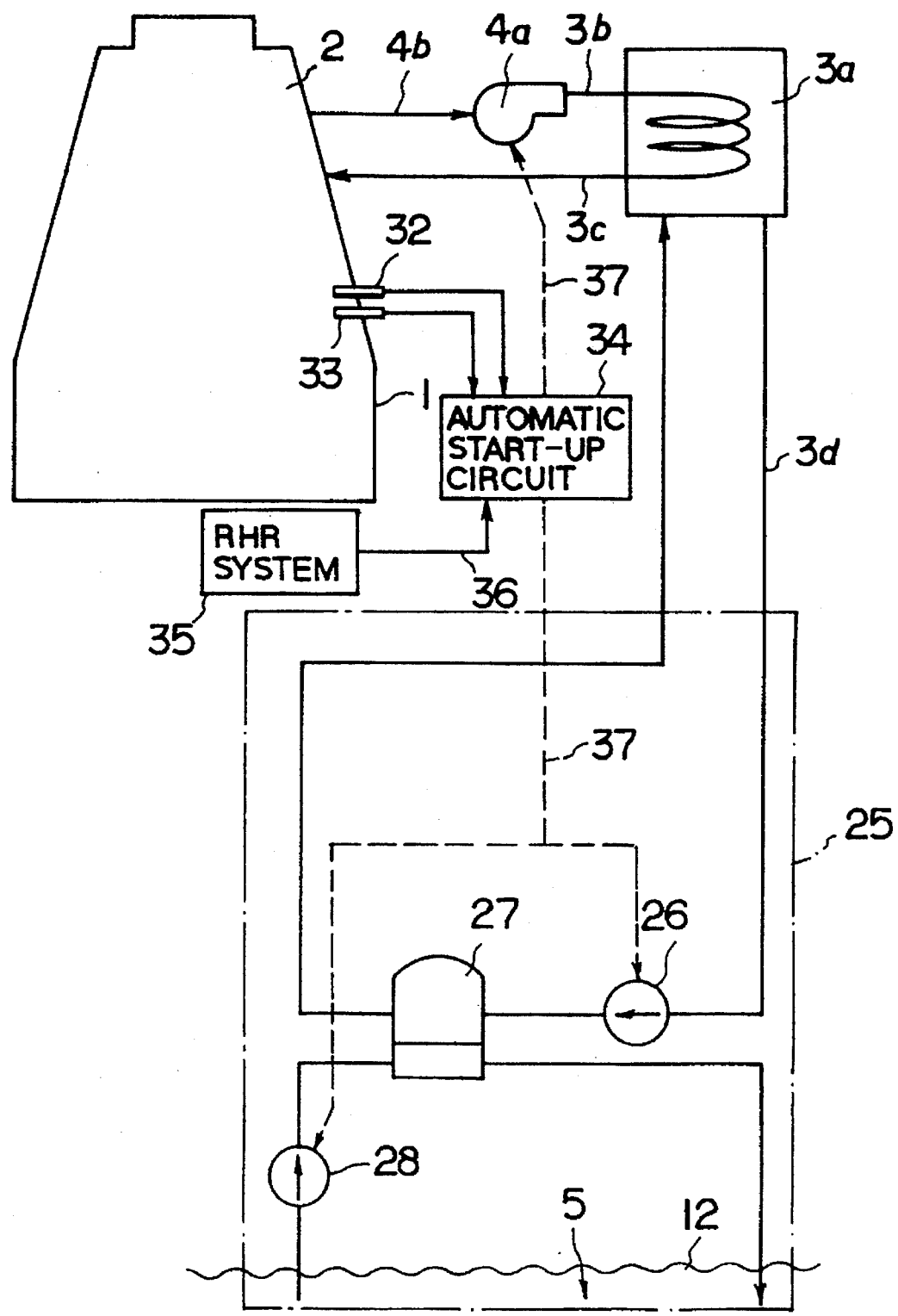
FIG. 10 is a block diagram showing a tenth embodiment of a reactor container provided with a dry well cooling system according to the present invention.

A tenth embodiment of the present invention will be described hereunder with reference to FIG. 10.

The tenth embodiment is different from the seventh embodiment in that a pressure sensor 32 and a temperature sensor 33 are disposed in the reactor container 1, and an emergency dry well cooling system automatic start-up circuit 34 is installed which detects an abnormal temperature or pressure increase in the dry well 2 by receiving an output signal from the sensor 32 or 33, also detects a function outage of a residual heat removing (RHR) system 35 by receiving a function outage signal output from the same, and then automatically starts up the emergency dry well cooling system.

The emergency dry well cooling system automatic start-up circuit 34 is electrically connected to the extra-dry-well blower 4a, the emergency dry well cooling system equipment cooling pump 26, and the emergency dry well cooling system equipment cooling seawater pump 28 via signal lines 37 for delivering output signals over the respective signal lines.

With this embodiment, even in a case where the residual heat removing system 35 should fail to start up operation and the operator should miss the failure of the RHR system 35, the emergency dry well cooling system is automatically started up on condition that the temperature or pressure in the dry well 2 exceeds a threshold, or the function of the RHR system is disabled, making it possible to ensure integrity of the reactor container 1.

Figure 11:
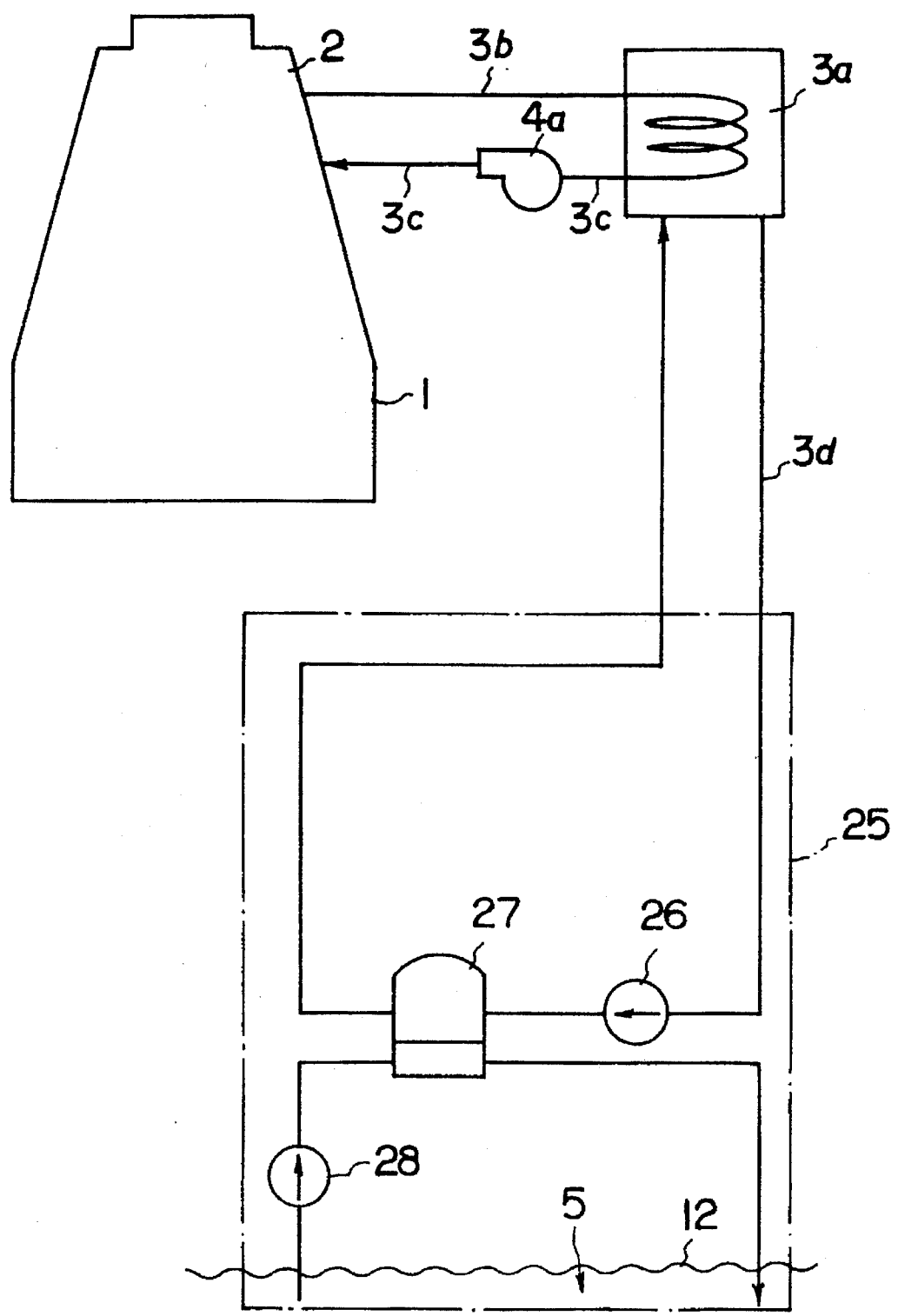
FIG. 11 is a block diagram showing an eleventh embodiment of a reactor container provided with a dry well cooling system according to the present invention.

An eleventh embodiment of the present invention will be described hereunder with reference to FIG. 11.

The eleventh embodiment is different from the seventh embodiment in that the extra-dry-well blower 4a is connected to the return pipe 3c on the primary side of the extra-dry-well heat exchanger 3a.

Stated otherwise, in the eleventh embodiment, the extra-dry-well blower 4a is disposed downstream of the extra-dry-well heat exchanger 3a. With this embodiment, since the extra-dry-well blower 4a is not exposed to the atmosphere having the temperature raised in the dry well 2, the function of the extra-dry-well blower 4a will not be deteriorated and the soundness of the reactor container can be maintained more surely.

Figure 12:
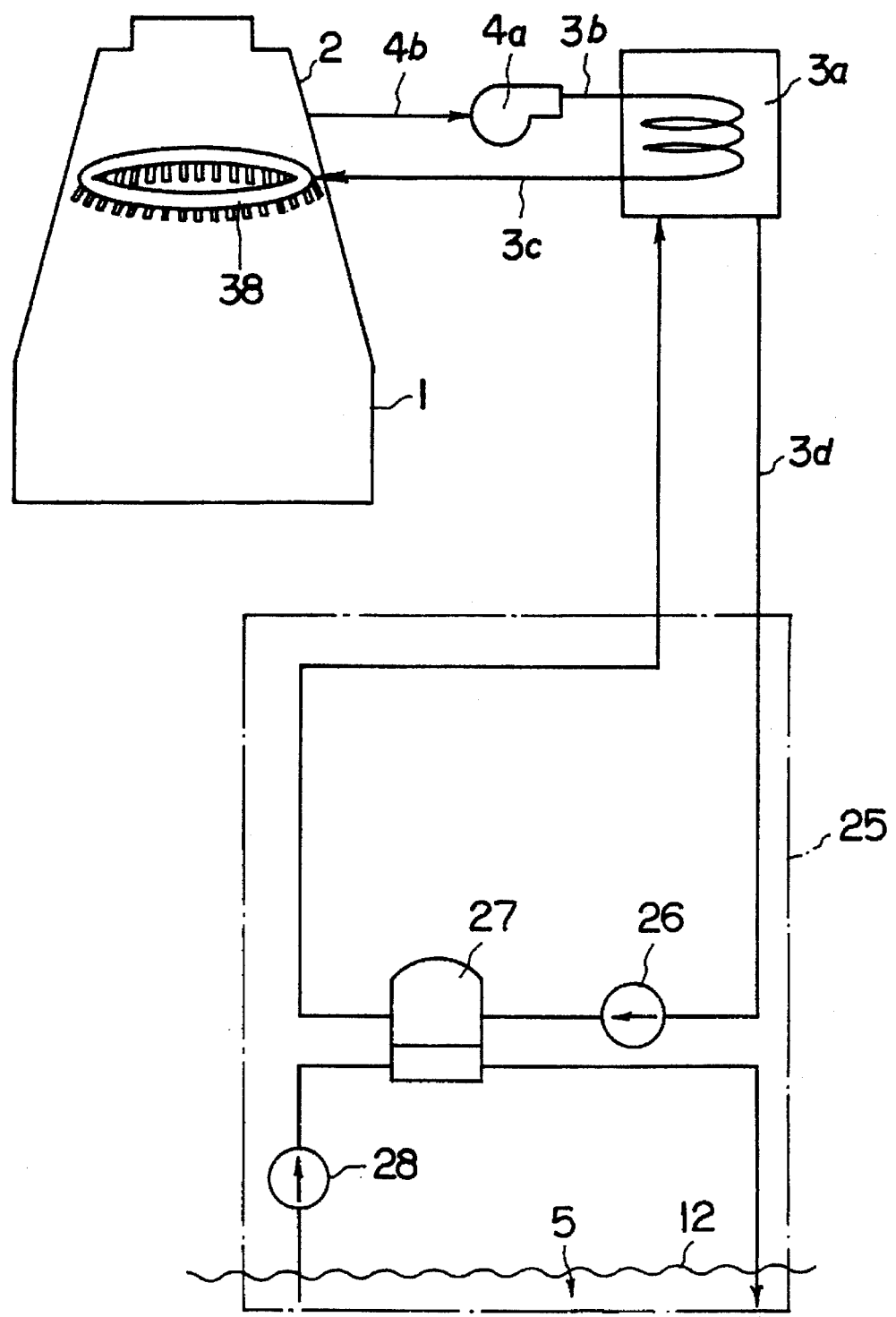
FIG. 12 is a block diagram showing a twelfth embodiment of a reactor container provided with a dry well cooling system according to the present invention.

A twelfth embodiment of the present invention will be described hereunder with reference to FIG. 12.

The twelfth embodiment is different from the seventh embodiment in that a header 38 is installed in the dry well 2 and the return pipe 3c on the primary side of the extra-dry-well blower 4a is connected to the header 38. With this embodiment, since the emergency dry well cooling system is provided with the header 38 at its delivery port, the atmosphere in the dry well 2 can be cooled with higher efficiency.

Figure 13:
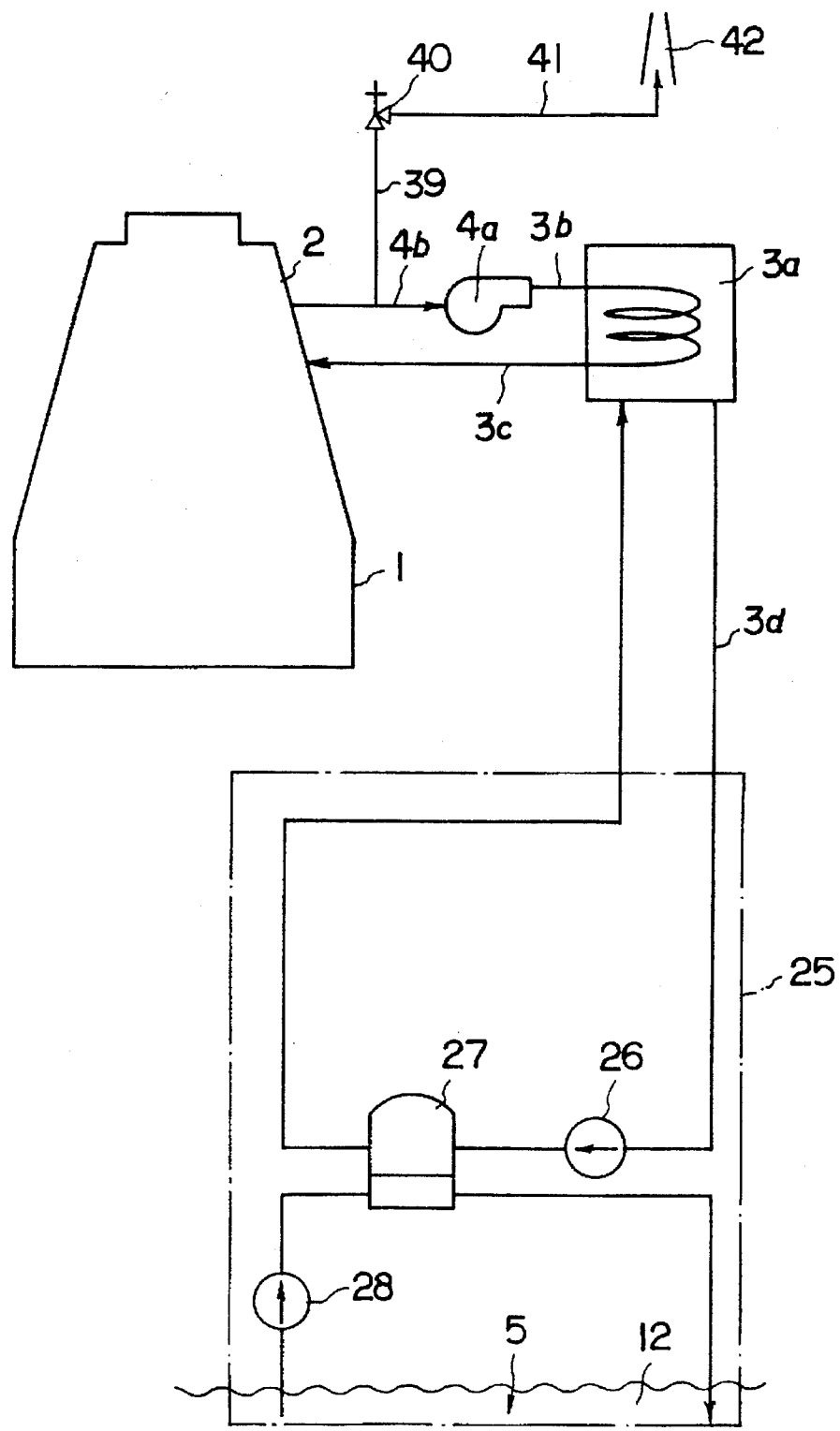
FIG. 13 is a block diagram showing a thirteenth embodiment of a reactor container provided with a dry well cooling system according to the present invention.

A thirteenth embodiment of the present invention will be described hereunder with reference to FIG. 13.

The thirteenth embodiment is different from the seventh embodiment in that a branch pipe 39 is connected to the pipe 4b interconnecting the reactor container 1 and the extra-dry-well heat exchanger 3a, a safety valve 40 is connected to the branch pipe 39, a discharge pipe 41 is connected to the safety valve 40, and a vent line 42 is connected to the discharge pipe 41.

With this embodiment, in the event of a severe accident such as anticipated transient without scram (ATWS) sequence, if the pressure in the dry well is abruptly raised in excess of the design pressure of the reactor container, the safety valve 40 is opened at a preset pressure and, therefore, the atmosphere in the dry well can be introduced to the vent line 42 to keep soundness of the reactor container 1.

According to the present invention, as described above, the heat removal from the dry well in the event of a severe accident can be performed by the normal dry well cooling system and the emergency dry well cooling system with high reliability and, at the same time, the pressure in the reactor container can also be reduced. As a result, it is possible to prevent breakage of the reactor container in the event of a severe accident.

A reactor container vent system which has been contemplated to be installed in the past is problematic in that because the atmosphere in the reactor container is directly discharged to open air for pressure reduction, fission products, though a very small amount, may be discharged to the environment and heat removal from the reactor container cannot be expected. By contrast, according to the present invention, it is possible to safely settle down a severe accident without discharging fission products.

According to the present invention, there are further provided the following embodiments which are represented by FIGS. 14 to 17, respectively, as fourteenth, fifteenth, sixteenth and seventeenth embodiments, in which like reference numerals are added to common members or equipments.

The fourteenth embodiment will be described hereunder with reference to FIGS. 14.

Figure 14:
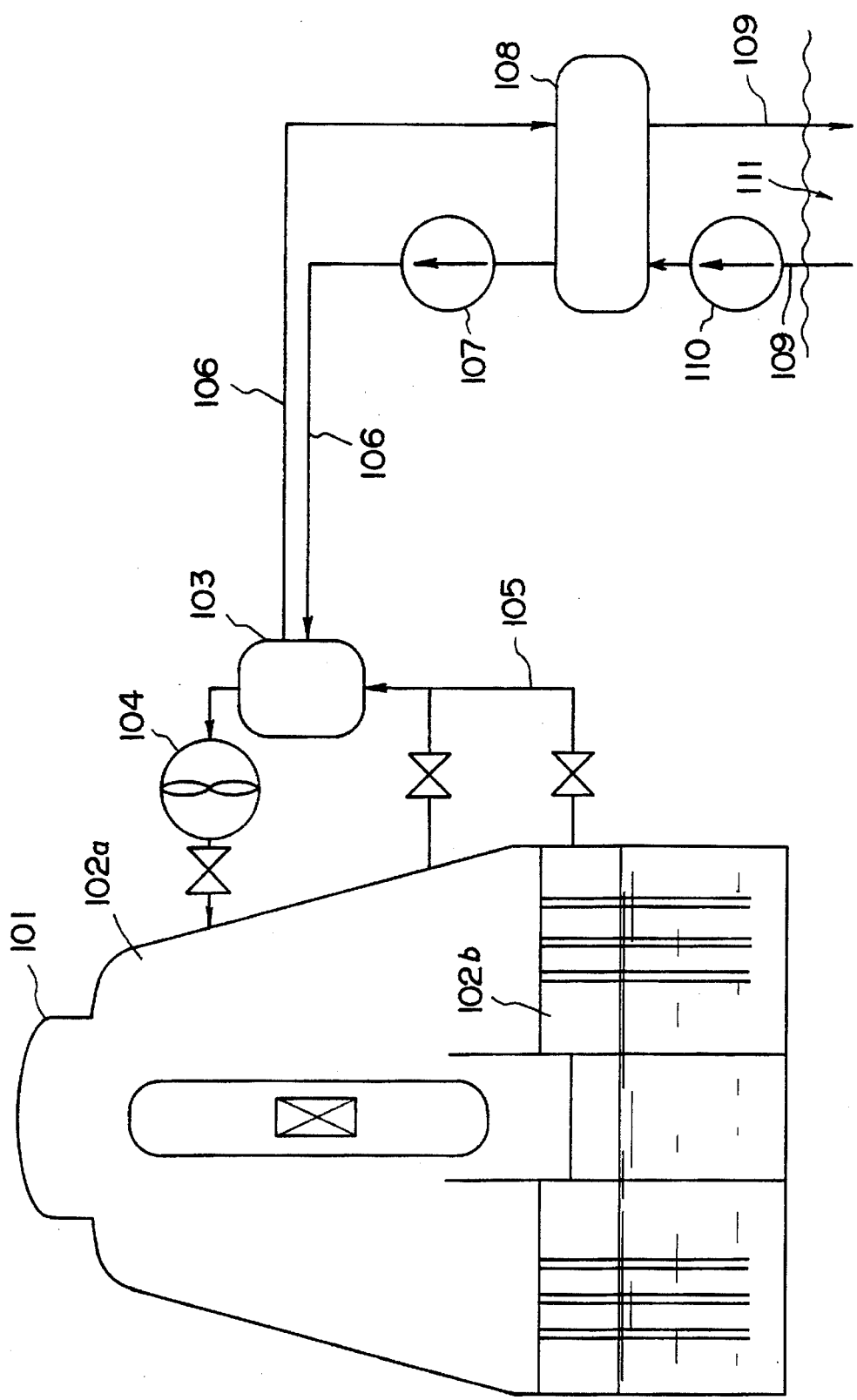
FIG. 14 is a block diagram showing a fourteenth embodiment of a reactor container provided with a dry well cooling system according to the present invention.

Referring to FIG. 14, a reference numeral 101 denotes a reactor container the inside of which is divided into an upper dry well 102a and a lower wet well 102b, and a pipe line 105 is communicated with the dry well 102a and the wet well 102b, respectively. An extra-dry-well heat exchanger 103 is also connected to the pipe line 105 and an extra-dry-well blower 104 is connected to the downstream side of the heat exchanger 103.

A primary cooling circulation pipe 106 is connected to a secondary side of the heat exchanger 103 and a primary cooling system is connected to the primary cooling circulation pipe 106. The primary cooling system comprises a primary cooling pump 107, a cooling system heat exchanger 108, a secondary cooling seawater circulation pipe 109 and a secondary cooling seawater pump 110, which are operatively associated with each other.

Figure 15:
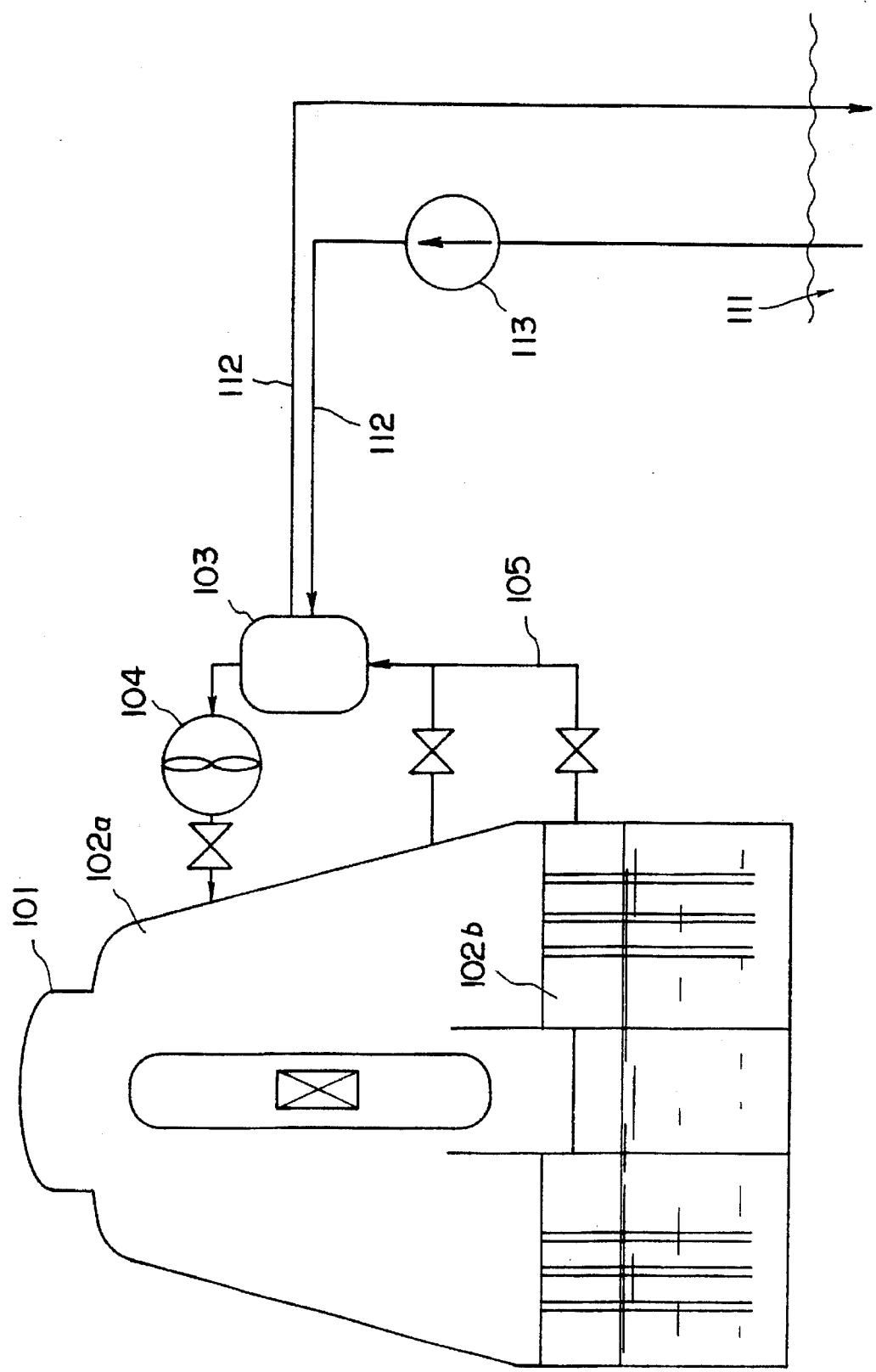
FIG. 15 is a block diagram showing a fifteenth embodiment of a reactor container provided with a dry well cooling system according to the present invention.

FIG. 15 represents the fifteenth embodiment of the present invention, which is similar to the fourteenth embodiment but different in an arrangement that the cooling system is composed of a direct seawater cooling system capable of supplying the seawater 111 directly to the heat exchanger 103 only through a seawater circulation pipe 112 and a seawater pump 113.

According to the fourteenth and fifteenth embodiments, even in a time when an equipment is damaged through a failure of the RHR system at an accident, the atmosphere in the reactor container 101 is guided to the heat exchanger through the operation of the blower 104 to thereby perform the cooling function, thus surely maintaining the soundness of the reactor container.

Figure 16:
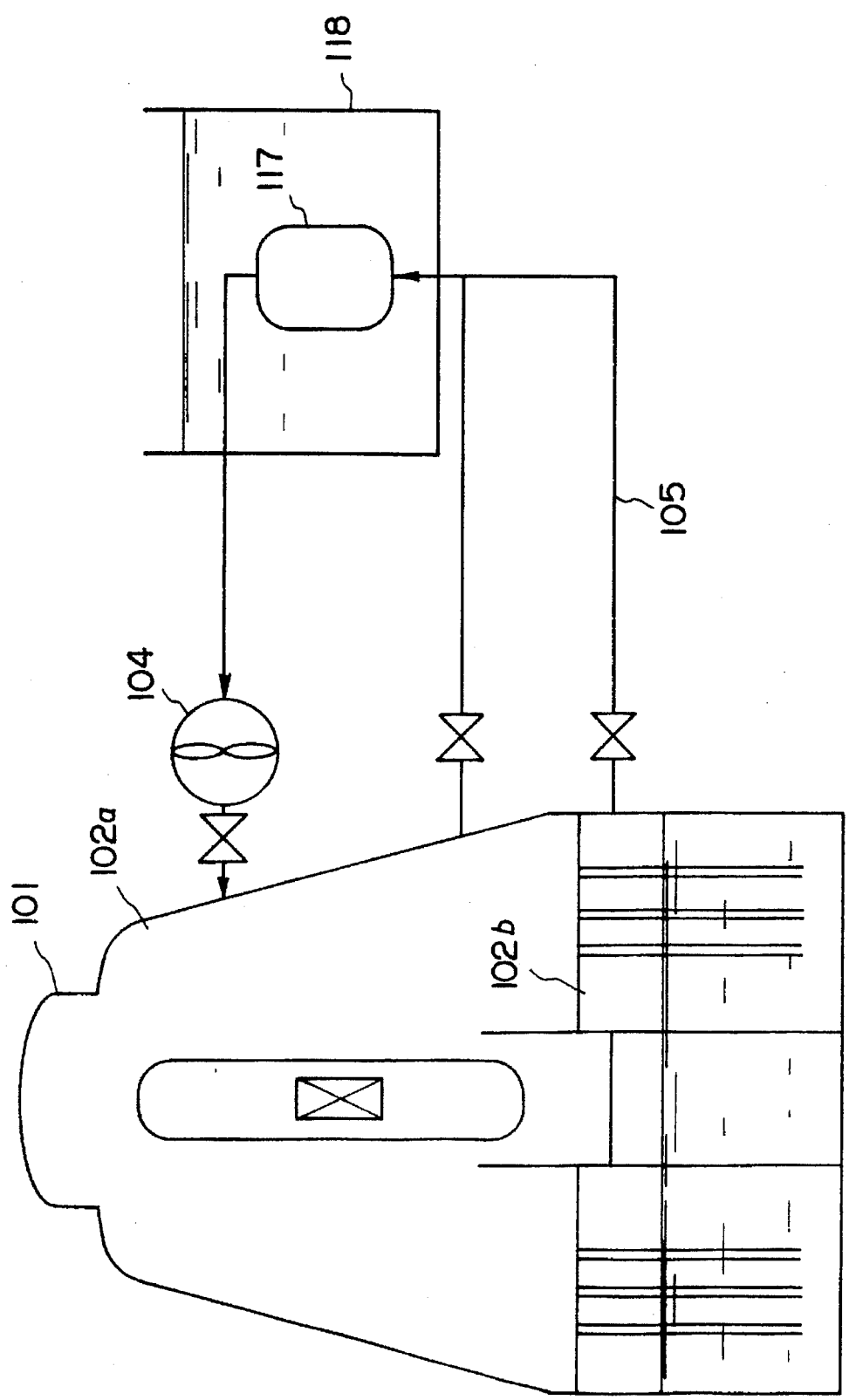
FIG. 16 is a block diagram showing a sixteenth embodiment of a reactor container provided with a dry well cooling system according to the present invention.

FIG. 16 represents the sixteenth embodiment of the present invention, in which there is located a cooling pool 118 opened to the atmosphere as a heat sink and a heat exchanger 117 is located in the cooling pool 118 filled up with water. The heat exchanger 117 is connected to the pipe line 105 and the blower 104. According to this embodiment, there is no need of any dynamic equipment such as pump for the operation of the cooling system, and because of this reason, the reactor container can be cooled with high reliability at a time of an occurrence of a severe accident.

Figure 17:
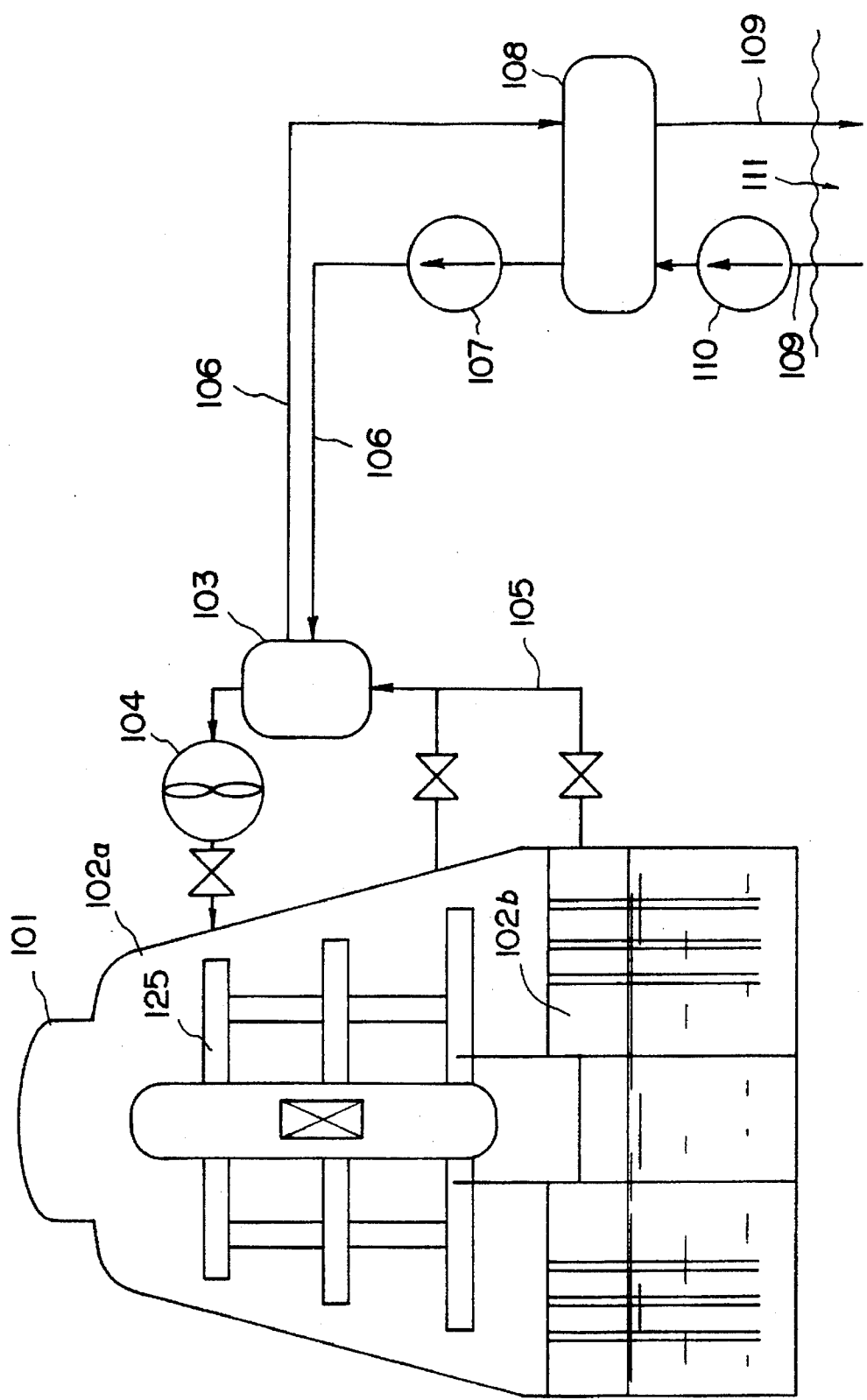
FIG. 17 is a block diagram showing a seventeenth embodiment of a reactor container provided with a dry well cooling system according to the present invention.
Figure 18:
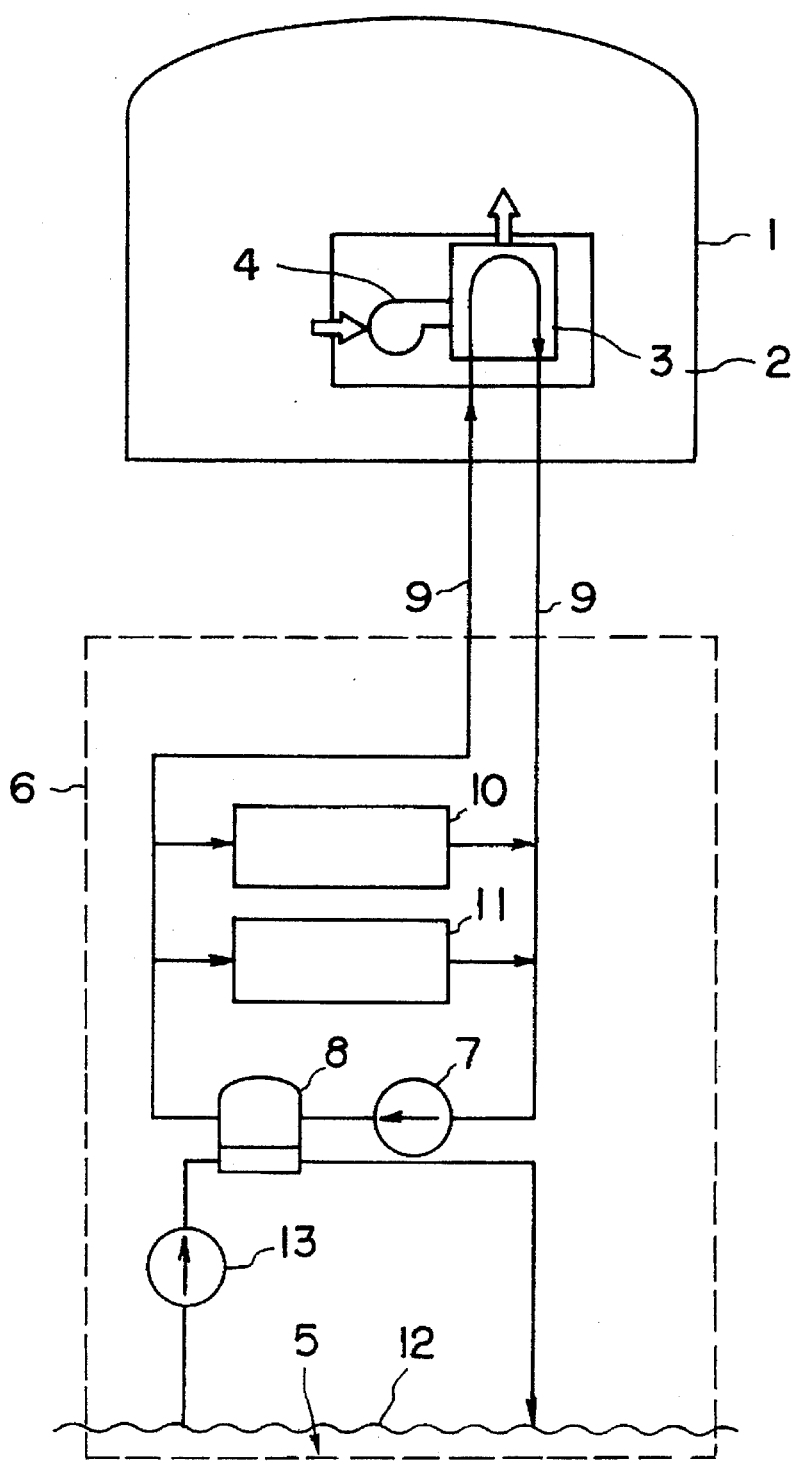
FIG. 18 is a block diagram showing a first example of a prior art reactor container provided with a dry well cooling system.
Figure 19:
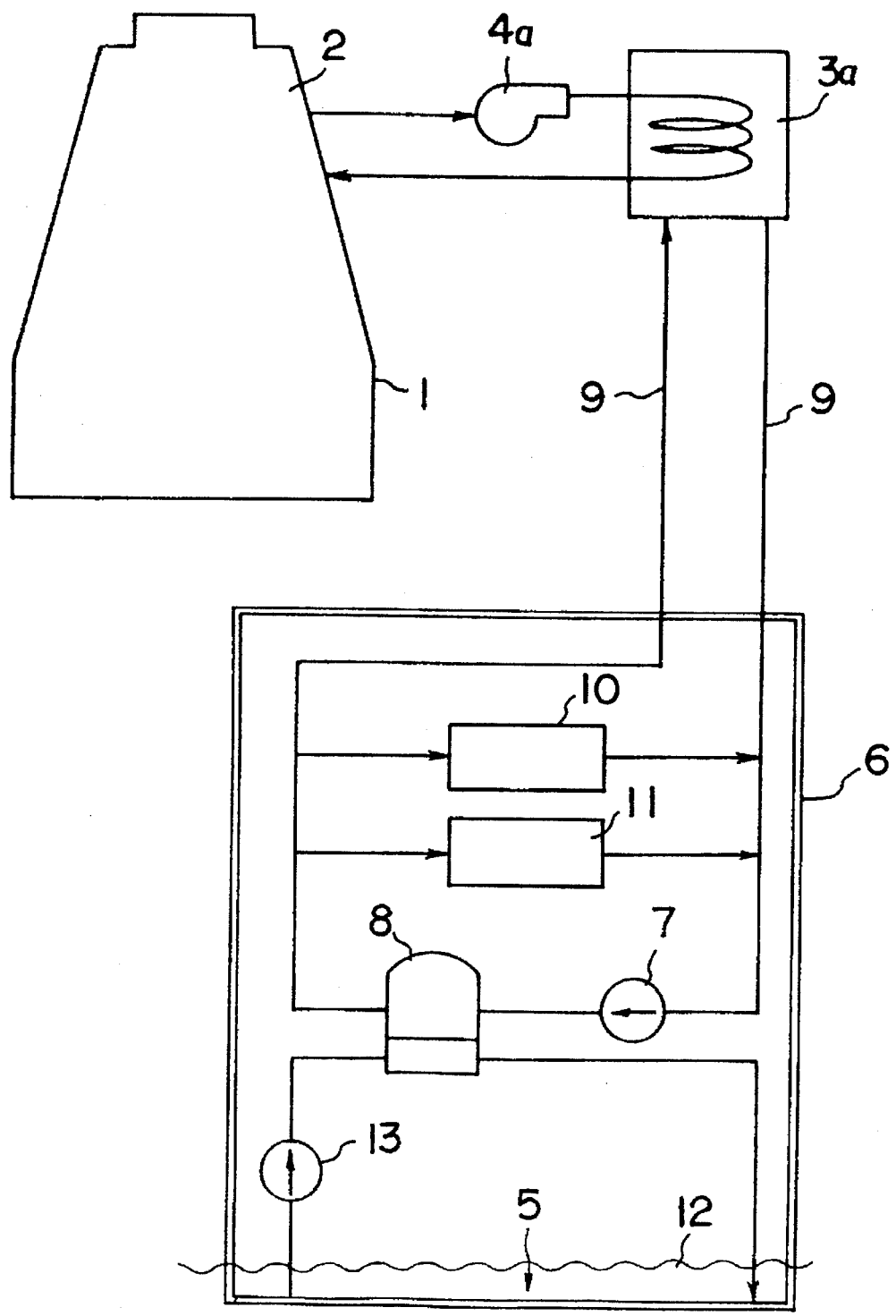
FIG. 19 is a block diagram showing a second example of a prior art reactor container provided with a dry well cooling system.

FIG. 17 represents the seventeenth embodiment of the present invention, which is different from the fourteenth embodiment in a location of a blower duct 125 in the reactor container 101. The blower duct 125 is connected to the pipe line 105. According to this embodiment, since the blower duct 125 is connected to a discharge side of the emergency dry well cooling system, the atmosphere in the reactor container 101 can be effectively cooled.

As can be seen from the above disclosure and drawings of FIGS. 14–17, according to the fourteenth to seventeenth embodiments, the pipe line 105 is connected to both the dry well and wet will, which is different from the former embodiments in which the pipe line is connected only to the dry well.

In a case where an accident occurs in a normal operation condition, the reactor scrams, and thereafter, vapor in the RPV is flown out in the vent tube or into the suppression pool through a safety relief valve. At this time, the vapor is condensed by the water in the suppression pool and a fission product contained in the vapor is captured in the suppression pool water through a scrubbing effect and transferred to the wet well gas phase. According to these embodiments of the present invention, the atmosphere in the wet well is circulated to the suppression pool liquid phase through the cooling system, the dry well and the vent tube, thus the fission product in the suppression pool gas phase being scrubbed more effectively.

When the accident occurs during the normal operation, the reactor is shut-down and the core is cooled. Thereafter, when the reactor container is cooled, by the RHR system through one of the suppression pool cooling mode and the dry well spray mode. In the prior art technology, the suppression pool cooling means is not provided, but according to the present invention, the safeness of the reactor can be realized with high performance.

Further, it will be easily understood that the first to thirteenth embodiments may be selectively applicable to the fourteenth to seventeenth embodiments of the present invention by persons skilled in the art without specifically describing herein through drawings.

It is also to be noted that the present invention will be described hereinbefore with reference to the preferred embodiments but it is not limited to them and many changes and modifications may be made without departing from the subjects and scopes of the appended claims.

What is claimed is:

1. A reactor container which includes a dry well and a wet well and which is provided with a dry well cooling system, said dry well cooling system comprising:

an in-dry-well heat exchanger disposed in the dry well of the reactor container;

an in-dry-well blower connected to a primary side of the in-dry-well heat exchanger;

first and second circulation pipes connected to the in-dry-well heat exchanger;

a normal cooling system connected to the secondary side of the in-dry-well heat exchanger through the circulation pipes and including an equipment cooling pump, an equipment cooling heat exchanger and a seawater pump which are operatively connected to each other; and a standby cooling system connected to said first and second circulation pipes at a position located in between said normal cooling system and said in-dry-well heat exchanger.

2. A reactor container according to claim 1, wherein said standby cooling system comprises a standby cooling pump, a standby cooling heat exchanger connected to said standby cooling pump and a standby seawater pump connected to the standby cooling heat exchanger.

3. A reactor container according to claim 2, wherein a normal power supply and an emergency power supply are connected to said in-dry-well blower, said seawater pump, said standby cooling pump and said standby seawater pump.

4. A reactor container according to claim 1, wherein said standby cooling system comprises a seawater circulation line for directly circulating a seawater therethrough and a seawater pump for pumping up the seawater.

5. A reactor container according to claim 1, wherein said standby cooling system comprises a standby cooling pump and an air cooler connected to each other.

* * * * *